US008812344B1

(12) United States Patent
Saurabh et al.

(10) Patent No.: US 8,812,344 B1
(45) Date of Patent: Aug. 19, 2014

(54) METHOD AND SYSTEM FOR DETERMINING THE IMPACT OF CROWDING ON RETAIL PERFORMANCE

(75) Inventors: Varij Saurabh, State College, PA (US);
Namsoon Jung, State College, PA (US);
Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 295 days.

(21) Appl. No.: 12/459,283

(22) Filed: Jun. 29, 2009

(51) Int. Cl.
*G06Q 10/00* (2012.01)
*G06Q 30/02* (2012.01)

(52) U.S. Cl.
CPC .................................. *G06Q 30/0201* (2013.01)
USPC .......................................................... 705/7.29

(58) Field of Classification Search
CPC ................................................. G06Q 30/0201
USPC ........................................................ 705/7.29
See application file for complete search history.

(56) References Cited

U.S. PATENT DOCUMENTS

| | | | |
|---|---|---|---|
| 4,924,416 A | 5/1990 | Sasao | |
| 6,563,423 B2 * | 5/2003 | Smith | 340/572.1 |
| 6,633,232 B2 | 10/2003 | Trajkovic et al. | |
| 6,987,885 B2 | 1/2006 | Gonzalez-Banos et al. | |
| 7,139,409 B2 | 11/2006 | Paragios et al. | |
| 7,457,436 B2 | 11/2008 | Paragios et al. | |
| 2002/0168084 A1 | 11/2002 | Trajkovic et al. | |
| 2006/0179014 A1 * | 8/2006 | Yoshida et al. | 706/12 |
| 2006/0200378 A1 * | 9/2006 | Sorensen | 705/10 |
| 2006/0227862 A1 * | 10/2006 | Campbell et al. | 375/240 |

OTHER PUBLICATIONS

Marcel Bouchard, "Common Crowd Dynamics: Shaping Behavioral Intention Models", Dec. 1, 2011, Southern Illiniois University Carbondale.*
Silberer, Günter, Oliver B. Büttner, and Alexander Gorbach. "Exploring shopping paths and attention behavior at the point of sale." 2007, Marketing theory and practice in an inter-functional world 8.*
U.S. Appl. No. 11/805,321, Sharma et al.
U.S. Appl. No. 11/999,649, Jung et al.
U.S. Appl. No. 12/215,877, Sharma et al.

* cited by examiner

*Primary Examiner* — Justin M Pats
*Assistant Examiner* — Amanda Gurski

(57) ABSTRACT

The present invention is a system, method, and apparatus for determining the impact of crowding on retail performance based on a measurement for behavior patterns of people in a store area. The present invention captures a plurality of input images of the people by at least a means for capturing images, such as cameras, in the store area. In the captured plurality of input images, each person's shopping path is detected by a video analytics-based tracking algorithm. A subset of the people is identified as a crowd in the store area. In relation to the crowd, the behavior patterns of the target person are measured. After aggregating the measurements for the behavior patterns over a predefined window of time, the present invention can calculate a crowd index and a crowd impact index for the store area based on the measurements. A crowd index shows the level of crowd density in the store area caused by a crowd, including traffic count of the crowd in the store area. A crowd impact index comprises a traffic count of the target people who make trips to the store area and a shopping time index, such as average shopping time changes of the target people, in relation to a crowd in the measured store area.

16 Claims, 19 Drawing Sheets

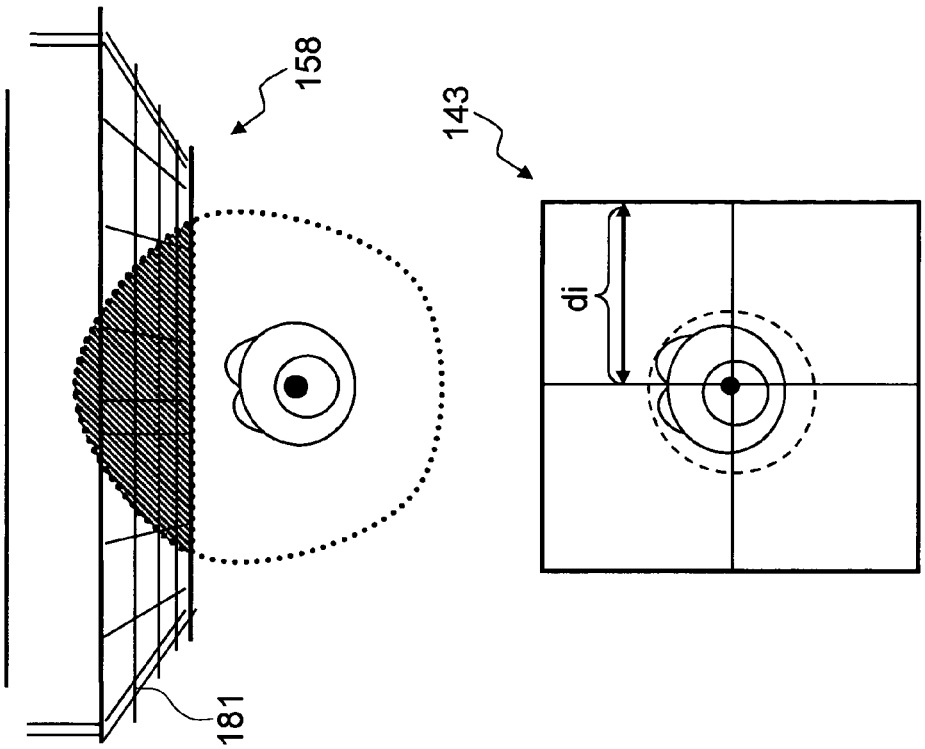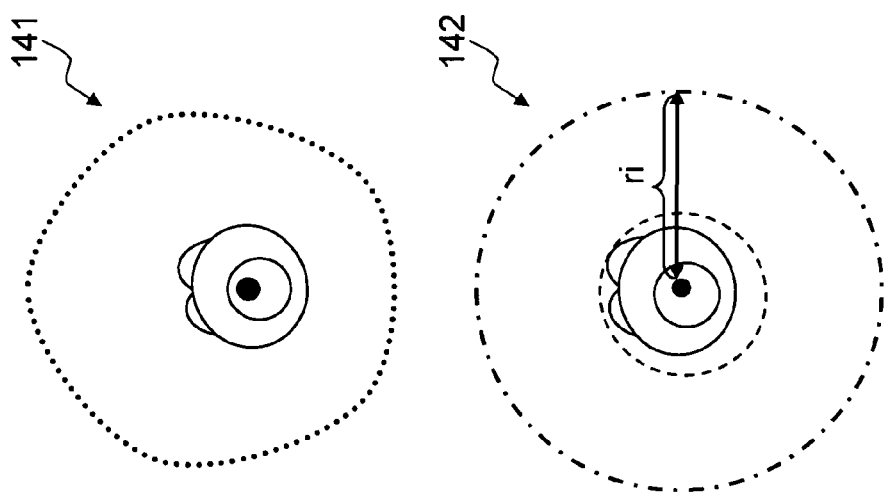
Fig. 4

TABLE 1 FOR CROWD INDEX (CI) FOR STORE AREA Si OVER DIFFERENT TIME PERIODS — 621

| Ti / Ni | T1 | T2 | T3 | ... | Tm |
|---|---|---|---|---|---|
| 1 | 0 | 0 | 0 | - | 0 |
| 2 | 0.02 | 0.02 | 0.02 | - | 0.02 |
| 3 | 0.03 | 0.03 | 0.03 | - | 0.03 |
| 4 | 0.05 | 0.05 | N/A | - | 0.05 |
| 5 | N/A | N/A | N/A | - | 0.06 |
| ... | - | - | - | - | - |

MAX CROWD SIZE = 3 AT Si DURING T3

Ni: CROWD SIZE BASED ON NUMBER OF SHOPPERS
Ti: TIME PERIOD

TABLE 2 FOR CROWD INDEX (CI) FOR STORE AREA Si OVER DIFFERENT TIME PERIODS — 622

| Ni | Ti / Ei/Ci | T1 | T2 | T3 | ... | Tm |
|---|---|---|---|---|---|---|
| 1 | E1 | 4 | 5 | 5 | - | 4 |
|   | C1 | 0 | 0 | 0 | - | 0 |
| 2 | E2 | 8 | 10 | 11 | - | 8 |
|   | C2 | 0.09 | 0.11 | 0.13 | - | 0.09 |
| 3 | E3 | 12 | 14 | 13 | - | 12 |
|   | C3 | 0.14 | 0.16 | 0.15 | - | 0.14 |
| ... | ... | - | - | - | - | - |
| Np | Ep | $Np_{T1}$ | $Np_{T2}$ | $Np_{T3}$ | - | $Np_{Tm}$ |
|    | Cp | $\dfrac{Np_{T1}}{G}$ | $\dfrac{Np_{T2}}{G}$ | $\dfrac{Np_{T3}}{G}$ | - | $\dfrac{Np_{Tm}}{G}$ |

Ei: CROWD SIZE BASED ON GRID ELEMENTS  Ci: CROWD INDEX i
Ni: NUMBER OF PEOPLE   G: GRID SIZE
Ti: TIME PERIOD

Fig. 14

TABLE FOR THE NUMBER OF A BEHAVIOR PATTERN FOR STORE AREA Si OVER DIFFERENT TIME PERIODS — 623

| Ti / Ci | T1 | T2 | T3 | ... | Tm |
|---|---|---|---|---|---|
| C1 | 0 | 1 | 0 | - | 0 |
| C2 | 1 | 3 | 2 | - | 3 |
| C3 | 3 | 5 | 8 | - | 7 |
| ... | - | - | - | - | - |
| Ci | Ut1 | Ut2 | Ut3 | - | Utm |

Ci: CROWD INDEX
Ti: TIME PERIOD
Uti: COUNT FOR A BEHAVIOR PATTERN DURING TIME PERIOD ti

TABLE FOR CROWD IMPACT INDEX (CII) FOR STORE AREA Si OVER DIFFERENT TIME PERIODS — 624

| Ti / Ci | T1 | T2 | T3 | ... | Tm |
|---|---|---|---|---|---|
| C1 | 0 | 0 | 0 | - | 0 |
| C2 | 0.09 | 0.34 | 0.25 | - | 0.27 |
| C3 | 0.41 | 0.80 | 1.18 | - | 0.95 |
| ... | - | - | - | - | - |
| Ci | $U_{t1} * \frac{Np_{T1}}{G}$ | $U_{t2} * \frac{Np_{T2}}{G}$ | $U_{t3} * \frac{Np_{T3}}{G}$ | - | $U_{tm} * \frac{Np_{Tm}}{G}$ |

Ci: CROWD INDEX
Ti: TIME PERIOD

Fig. 15

METHOD AND SYSTEM FOR DETERMINING THE IMPACT OF CROWDING ON RETAIL PERFORMANCE

BACKGROUND OF THE INVENTION

1. Field of the Invention

The present invention is a system, method, and apparatus for determining the presence of a crowd and its impact on retail performance, using video analytics-based measurement of behavior patterns of people in a store area, where a crowd index measures the level of crowding in a store area, which can be correlated with the changes in behavior of people and changes in sales.

2. Background of the Invention

An earlier attempt for crowd detection can be found in U.S. Pat. No. 4,924,416 of Sasao (hereinafter Sasao). Sasao disclosed an apparatus for detecting the degree of crowding in an elevator hall, using a television camera and illumination controller. The application area of the apparatus is related to an elevator hall that is very different from a retail space. Therefore, Sasao was entirely foreign to the idea of measuring the crowd impact on shopper behavior. Furthermore, Sasao counted brightness difference between a hall video data and a reference data stored in a data memory to calculate the degree of crowding. Sasao is completely different from the ideas and methods of crowd detection disclosed in the present invention. In an exemplary embodiment, the present invention applies spatiotemporal criteria to shoppers' trips to detect a crowd and calculate a crowd index in a store area in a retail space. The shoppers' trips are detected based on tracking information by video analytics of the video images captured in the target measurement area.

U.S. Pat. No. 6,987,885 of Gonzalez-Banos, et al. (hereinafter Gonzalez-Banos) disclosed a system and method to determine the number of people in a crowd, using visual hulls. Gonzalez-Banos is based on aggregated planar projections of the intersections of a silhouette image cone and a working volume. Gonzalez-Banos is entirely foreign to the idea of using image-based tracking to detect shoppers' trips in a retail store and detect a crowd based on the tracking of people. Furthermore, Gonzalez-Banos is entirely foreign to the idea of determining the impact of crowding on retail performance, as disclosed in the present invention.

U.S. Pat. No. 7,139,409 of Paragios, et al. and U.S. Pat. No. 7,457,436 of Paragios, et al. (hereinafter Paragios) disclosed a system and method for crowd density estimation in a subway environment. Paragios used a change detection algorithm to distinguish a background scene from a foreground, and Paragios combined the change detection map with geometric weights to estimate a measure of congestion of the subway platform. Paragios used the total weighted sum over the segmented region as the calculated crowdedness measure. Paragios' method is specific to a subway platform application. Paragios is also foreign to the idea of using image-based tracking to detect shoppers' trips in a retail store and detect a crowd based on the tracking of people. Furthermore, Paragios is entirely foreign to the idea of determining the impact of crowding on retail performance, as disclosed in the present invention.

U.S. Pat. No. 6,633,232 of Trajkovic, et al. and U.S. Pat. Appl. Pub. No. 20020168084 of Trajkovic, et al. (hereinafter Trajkovic) disclosed a vision system for computing crowd density. Trajkovic suggests some methods of crowd prediction in a general approach. For example, Trajkovic suggests an image compression process as a surrogate for prediction of crowd density. Trajkovic also suggests historical information, external data, and probabilistic techniques as methods to predict the crowd. Although Trajkovic further suggests usage of a classification engine that is programmed to distinguish masses of individuals, where the classification engine identifies the locations and motion vectors of each individual, Trajkovic is entirely foreign to the idea of using image-based tracking to detect shoppers' trips in a retail store and to detect a crowd based on the tracking of people, as discussed in the present invention. In an exemplary embodiment, the present invention applies spatiotemporal criteria to shoppers' trips to detect a crowd, not just to predict, and the present invention calculates a crowd index based on the crowd detection in a store area in a retail space. Furthermore, Trajkovic is entirely foreign to the idea of determining the impact of crowding on retail performance, as disclosed in the present invention.

SUMMARY

The present invention is a system, method, and apparatus for determining the impact of crowding on retail performance based on a measurement of behavior patterns of people in a store area.

The invention achieves the goal in the following steps: define crowding, calculate the associated crowd index, quantify changes in shopping behavior, and build statistical models to predict changes in shopping behavior and sales based on changes in the crowd index.

Retail performance is directly linked to shopper behavior in the store area. Typically, if shoppers spend more time interacting with the products, they are more likely to purchase the products. People have a sense of personal space—the region surrounding each person that a person considers their domain or territory—and often if entered by another being without this being desired, it makes them feel uncomfortable. In a crowded environment they might feel rushed because of people entering their personal space. As a result they might not interact with products long enough to make a purchasing decision, which leads to higher rates of abandonment and lost sales. Therefore, crowding can be directly linked with the financial performance of a store area. The current invention also provides the ability to calculate the elasticity of changes in shopper behavior and financial performance with crowding. These unique analytics will help retailers optimize the traffic levels in different parts of their stores to maximize sales while providing a positive shopping experience.

The present invention captures a plurality of input images of the people by at least a means for capturing images, such as cameras, in the store area. For simplicity in the specification for the present invention, the term "camera" will be used to indicate the means for capturing images, and the term "store area" will be used to indicate a contiguous part of a store, such as an aisle. The term "target store area" will be used to designate a store area that is measured for the crowd index and crowd impact index. Occasionally, the terms "store area" or "measured store area" may be used instead of the term "target store area" to imply the "target store area" in a certain context in the description.

In the captured plurality of input images, each person's shopping path is detected by a video analytics-based tracking algorithm. The data is collected in a database and is referred to as shopper data. In an exemplary embodiment, the current invention uses two different methods to calculate the crowd index (CI), which tracks the level of crowding in the store area. The occurrence of different types of shopper behavior, such as changes in average shopping duration, number of u-turns, etc., are linked with CI, using statistical analyses like correlation, regression, etc. to measure the impact of crowding on shopper behavior in that store area.

The impact of the presence of movable objects or installed objects in the store area can also be measured by adding the count for the movable objects or installed objects to the crowd index. Examples of movable objects include carts and baskets, and examples of installed objects include marketing elements, media elements, and displays. The objects can be predefined as a fraction of people because, even though they make it difficult to navigate the store area, they don't encroach upon the shopper's personal space and, thus, are less invasive than people.

A subset of the people is identified as a "crowd" in the store area. In relation to the crowd, the behavior patterns of a "target shopper," "target shoppers," a "target person," or "target people" are measured. In this specification, the "target shopper," "target shoppers," "target person," or "target people" are defined as the shopper(s), person, or people who are in a target store area where a crowd is detected, who do not belong to the crowd during a certain period, and whose shopping activity in the target store area may be impacted by the crowd. After aggregating the measurements for the behavior patterns over a predefined window of time, the present invention can calculate a crowd index and a related elasticity that associates shopper behavior with the crowd index, e.g., the crowd impact index for the store area, based on the measurements.

A crowd index shows the level of crowd density in the store area caused by a crowd, including a traffic count of the crowd in the store area. A crowd impact index comprises a traffic count of people outside the crowd who make trips to the store area and whose shopping activity may be impacted by the crowd, and the shopping time index, such as average shopping time changes, of the people outside the crowd in relation to a crowd in the measured store area.

The first step in the process is defining the crowd. In another approach, the present invention defines a crowd as a group of people present within a physical space, where their presence and behavior may impact each other's behavior or the target shoppers' behavior.

The second step in the process is defining and calculating the crowd index. Certain attributes of the store area, such as total length of shelf space, shopping area (total area available to people for navigation), etc., also play an important role in defining the crowd index. The invention can use a variety of methods to calculate the crowd index from the shopper data. Two of such exemplary methods are 1) the population-based method and 2) the shopper trip-based method.

The population-based method counts the number of shoppers per square foot of shopping area in the store area. The present invention can also count the number of shoppers within a given radius of a shopper when they are in the store area, as a relative measure among the shoppers. The calculation of the average density of sections in the store area over a predefined period of time is used to produce a density map. The shopper trip-based method measures the frequency and extent of personal space encroachment among the shoppers present in the store area. The measurement is taken instantaneously, at regular intervals. The instantaneous measure of the crowd index is then averaged over the interval to get a continuous measure of CI.

The third step in the process is to quantify changes in shopping behavior. The invention tracks people as they navigate and shop the store area using automated processes. The invention then extracts various parameters, such as shopping time, speed of travel, number of shopping stops, shopping path, etc., from the data. These parameters are tracked continuously and measured over time to quantify the changes.

The fourth step in the process is to build statistical models to predict changes in shopping behavior and sales based on changes in the crowd index.

The present invention empirically measures the relationship between CI and relevant metrics. Each behavior has an elasticity associated with it that predicts the change in that particular behavior. The elasticity may change depending on season, occasion, time-of-day, and trip type. The elasticity can also be different for different shopper segments.

The behaviors impacted by crowding include u-turns, shopping time, traffic to shopper conversion rate, number of shopping stops, product interaction, etc. The financial impact of crowding is measured using metrics, such as basket size, sales per square foot, total sales, etc. The impact of crowding is measured by relating the incidence of u-turns to the number of people, i.e., the crowd, in the store area and measuring the loss caused by the incidence. The impact of crowding is also regarded as the level of barrier. The level of barrier indicates how the crowd impacts the shopping trips of other shoppers' in the store area. For example, the loss caused by u-turns can be regarded as the level of barrier in the shoppers' shopping trips by the crowding.

Based on the analysis of the crowd index and elasticity, e.g., the crowd impact index, the present invention finds the optimum level of crowding where sales is highest. Using this information, the present invention can calculate the optimal shopper distance among the shoppers by measuring the average distance between tracks in the crowds when the crowding level is at the optimum level. In addition, the indices help the decision maker in the retail space when making a decision for adding secondary locations for busy categories, and quantify loyalty through analysis of sales per segment. The present invention measures the relationship of the crowd index and the crowd impact index to the following variables: performance of categories, store layout, and purchase movement in the store area. The purchase movement can include paths to purchase, product selection processes, and shopper decision processes.

DRAWINGS

Figures

FIG. 4 shows exemplary personal spaces that are used for crowd detection.

FIG. 14 shows exemplary tables for the crowd index of a store area over different time periods.

FIG. 15 shows an exemplary table for the number of impacted behaviors in a store area and a table for the crowd impact index for the store area over different time periods.

Figure 19:
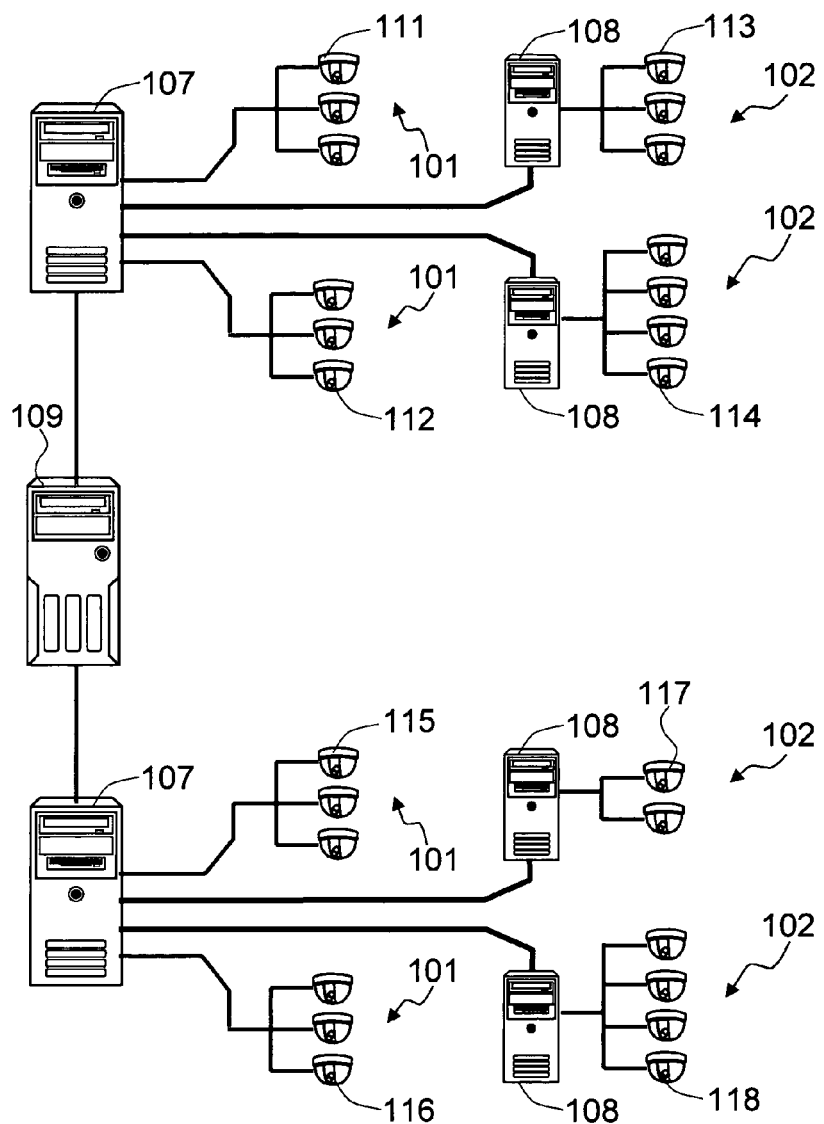

FIG. 19 shows an exemplary network of a plurality of means for control and processing and a plurality of means for capturing images in the present invention, where the network further consists of a plurality of first means for control and processing and a plurality of second means for control and processing, which communicate with each other to synchronize the time-stamped lists of measurement among a plurality of video streams captured by the means for capturing images in the measured locations.

DETAILED DESCRIPTION OF THE INVENTION

Figure 1:
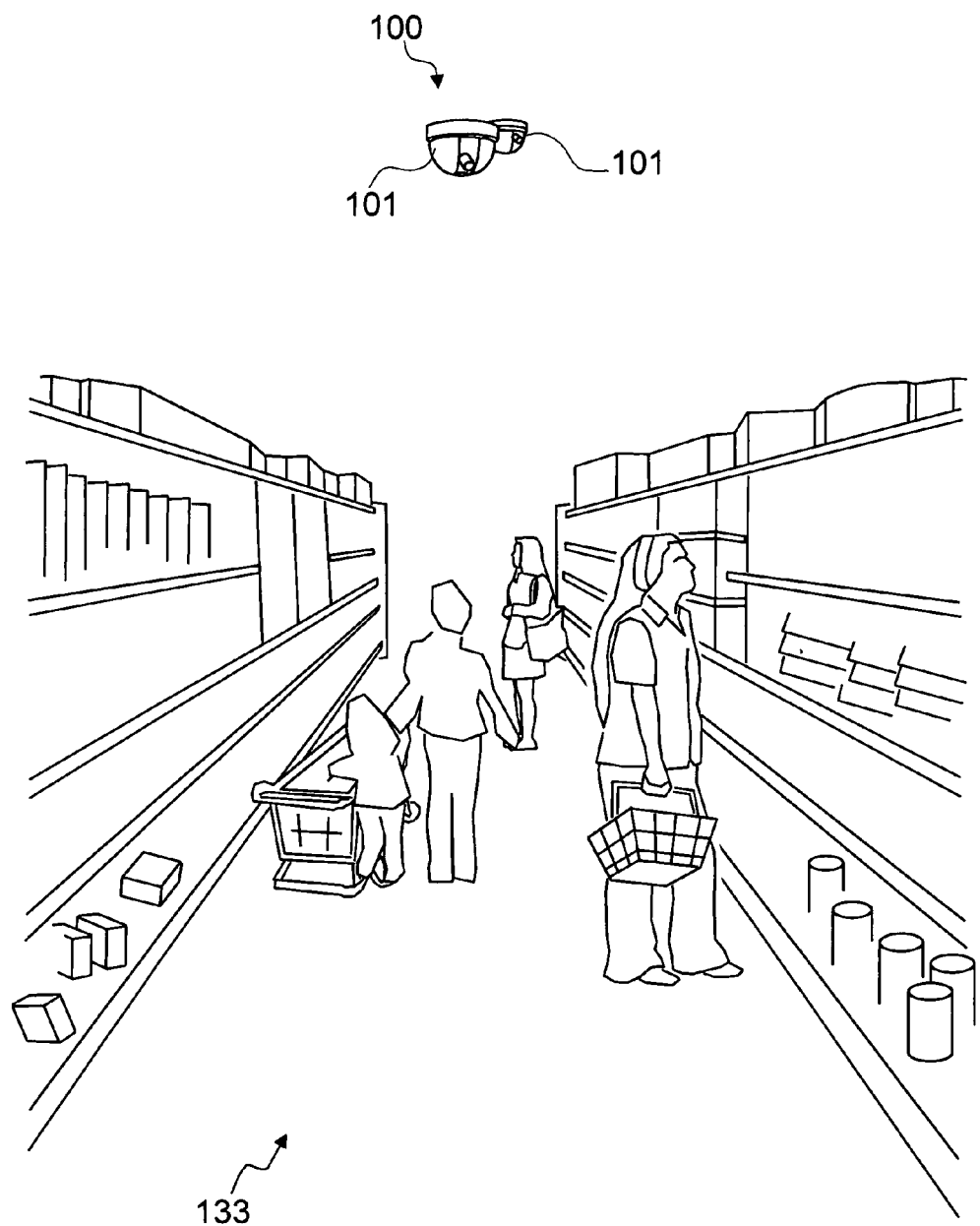
FIG. 1 shows an overview of an application of an exemplary embodiment of the present invention.

FIG. 1 shows an overview of an application of an exemplary embodiment of the present invention.

The present invention is a system, method, and apparatus for determining the impact of crowding on retail performance based on a measurement for behavior patterns of people in a store area. The present invention captures a plurality of input images of the people by at least a means for capturing images 100, such as cameras, in the store area. In FIG. 1, a plurality of first means for capturing images 101 are installed in a location from which the system can capture the images of shoppers and detect the trips of the shoppers in a store area 133, such as an aisle. In an exemplary embodiment of the present invention, the first means for capturing images 101 is usually installed where the field-of-view can cover the traffic of the people in the measured store area. For simplicity in the specification for the present invention, the term "camera" will be used to indicate the means for capturing images, and the term "store area" will be used to indicate a contiguous part of a store, such as an aisle.

In the captured plurality of input images, each person's shopping path is detected by a video analytics-based tracking algorithm. The data is collected in a database and is referred to as shopper data. In an exemplary embodiment, the current invention uses two different methods to calculate the crowd index (CI), which tracks the level of crowding in the store area. The occurrence of different types of shopper behavior, such as changes in average shopping duration, number of u-turns, etc., are correlated with CI to measure the impact of crowding on shopper behavior in that store area. Retail performance is directly linked with the shopper behavior in the store area. Typically, if shoppers spend more time in the store area and interact with the products longer, they are more likely to purchase the products. Therefore, crowding can be directly linked with financial performance of the store area. The current invention also provides the ability to calculate the elasticity of change in shopper behavior and financial performance with crowding. These unique analytics will help retailers optimize the traffic levels in different parts of their stores to maximize sales while providing a positive shopping experience. The calculations of the elasticity in the change in crowd, change in shopper behavior, and change in sales can show the relationship among the crowd, shopper behavior, and sales data in a novel way in the present invention.

The impact of the presence of movable objects or installed objects in the store area can also be measured by adding the count for the movable objects or installed objects to the crowd index. In this case, the count for the objects can be predefined as a fraction of a count for a person. Although the size of the objects in the projected image view may be bigger than a shopper's body size, they do not have peripheral attachment that can be physically extended farther. For example, a cart's size in the view from the top-down camera could be bigger than a person's size in the same view, but they do not have moving parts, such as arms and legs as for a person. The objects also are not concerned with human factors, such as emotional and personal perception, for a minimum personal space between shoppers. Therefore, the count for the objects can be weighted as a fraction of a normal count in the calculation for the crowd index. Examples of movable objects include carts and baskets, and examples of installed objects include marketing elements, media elements, and displays. The location and size of the installed objects in the store area are previously known. Therefore, the installed objects are identified in the measurement of the store area with the prior knowledge, and its role in the crowd index can be adjusted based on the prior knowledge, such as the planned location and spatial size of the installed objects.

A subset of the people is identified as a crowd in the store area. In relation to the crowd, the behavior patterns of target persons are measured. After aggregating the measurements for the behavior patterns over a predefined window of time, the present invention can calculate a crowd index and a crowd impact index for the store area based on the measurements. The crowd index shows the level of crowd density in the store area, including the traffic count of the crowd in the store area. The crowd index is normalized. For example, the crowd index can be calculated based on counts per square foot of store area, although the store areas may have different sizes. A crowd impact index comprises the traffic count of target people who make trips to the store area and a shopping time index, such as the average shopping time changes of the target people, in relation to a crowd in the measured store area.

The invention can use a variety of methods to calculate crowd index from the shopper data. Two such exemplary methods are described below.

1) Population-based method:

The population-based method calculates the average density of shoppers and movable objects per unit shelf space in the store area over a given period of time.

$$CI = \left[ \frac{\sum_{i=1}^{n} x_i + \alpha * \sum_{i=1}^{n} y_j}{n} \right] * \frac{1}{LA} \qquad (1)$$

where CI is the crowd index, $x_i$ is the count of shoppers in the store area at the instant i, $y_i$ is the count of movable object in the store area at the instant i, n is the number of time x and y are measured over a given time period., $\alpha$ is the factor by which the impact of objects differ from that of shoppers, L is the total linear shelf space in the store area where shoppers can shop.

A is the total floor area of the store area where shoppers can shop.

Normalizing by area and linear shelf space is important, because smaller areas typically get crowded quickly, and crowding is most likely to occur close to the shelves, where shopping occurs. Wider aisles typically improve store navigation, but will not improve the shopping experience beyond a certain point.

2) Shopper trip-based method:

CI=f(shoppers' personal space area, portion of shoppers' personal space area that overlaps with other shoppers/movable objects, number of shoppers)

$$CI = \frac{1}{n} \sum_{i=1}^{n} \left[ \frac{\sum_{j=1}^{m} (a_{js} + \alpha * a_{jo})}{\sum_{j=1}^{m} A_j} \right] \quad (2)$$

where CI is the crowd index, $a_{js}$ is the personal space of shopper j encroached upon by other shoppers at the instant i, $\alpha$ is the factor by which the impact of objects differ from that of shoppers, $a_{jo}$ is the personal space of shopper j encroached upon by movable objects at the instant i, $A_j$ is the total personal space of the shopper j m is the total number of shoppers present in the store area at instant i n is the number of time $a_s$ and $a_o$ are measured over a given time period.

The formula can be modified to meet the specific needs of the retailer.

The present invention calculates the average density of the sections in the store area over a predefined period of time. The density map can be used to calculate how the crowding influenced the performance of the store area over the period of time in an exemplary embodiment. An activity map is constructed based on the crowding in each section in the store area.

The present invention empirically measures the elasticity of shopper behavior with respect to the crowd index. In the present invention, the elasticity is defined as the change in behavioral response to the crowding. Each behavior comprises an elasticity associated with it and the elasticity may change depending on season, occasion, time-of-day, types of products merchandised, or trip type. The elasticity is measured for each shopper segment. The segmentation can be done using a defining characteristic of the shopper group, such as demographics.

The behaviors impacted by crowding include u-turns, shopping time, traffic to shopper conversion rate, number of shopping stops, product interaction, etc. The financial impact of crowding is measured using metrics, such as basket size, sales per square foot, total sales, etc. The impact of crowding is measured by relating the incidence of u-turns with the number of people, i.e., the crowd, in the store area and measuring the loss caused by the incidence. The loss might include loss of sales, loss of dollar value, and loss of shopper traffic count in the store area. The impact of crowding is also regarded as the level of barrier. The level of barrier is calculated based on prolonged shopping time duration and change in the conversion rates, in addition to the u-turn count.

Based on the elasticity analysis of the crowd index, the present invention finds the optimum level of crowding based on retailer needs, such as the level at which total sales are highest, or sales per shopper are highest, etc. For example, the size of the store area or category groups in the store area can be adjusted to optimize the crowd index and crowd impact index. Using the information of the optimum level of crowding, the present invention can calculate the optimal shopper distance among the shoppers by measuring the average distance between tracks in the crowds when the crowding level is at the optimum level. In addition, the analysis will help the retailer modify the store area to improve the shopper experience, e.g., adding secondary locations for busy categories or increasing shelf-space to improve shopper loyalty.

The present invention measures the relationship of the crowd index and the crowd impact index to the following variables: performance of categories, store layout, and purchase movement in the store area. The relationship to the performance of categories is analyzed according to the characteristics of the categories, including category distribution and category allocation. The measurement for the relationship with the store layout is used to optimize the size and shape of the aisle and to control crowd navigation. The purchase movement is distinguished between premeditated purchase movement and impulse purchase movement.

Figure 2:
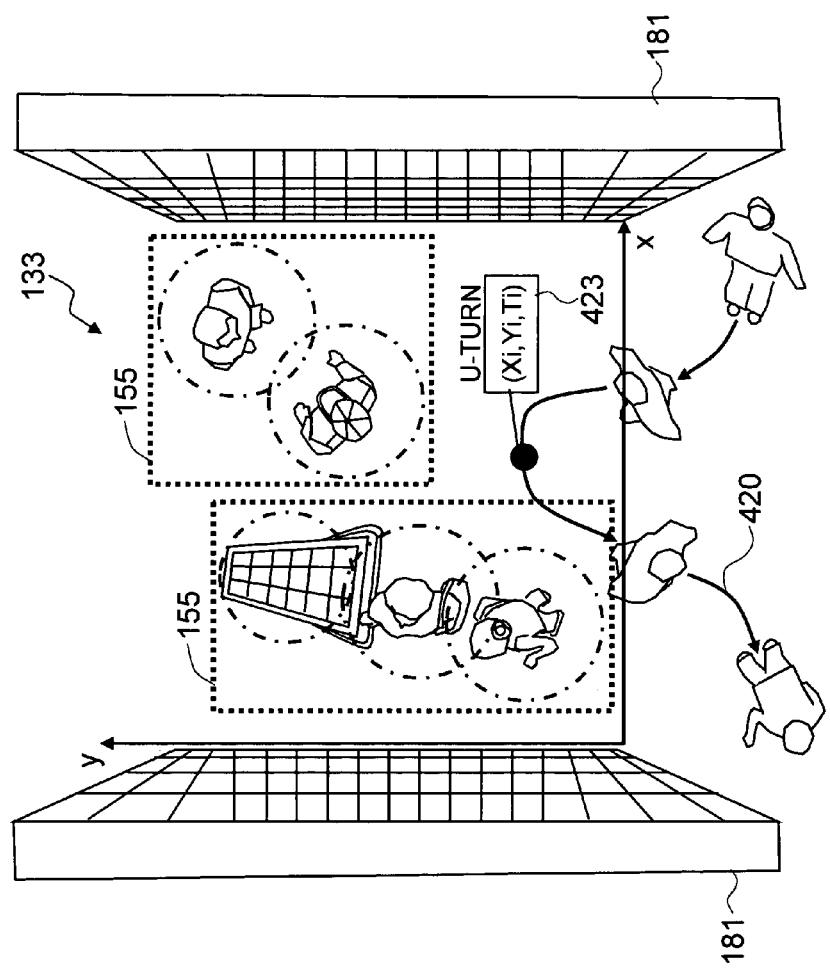
FIG. 2 shows an exemplary crowd formation in a store area and the crowd impact on the behavior of a shopper.

FIG. 2 shows an exemplary crowd formation in a store area and the crowd impact on the behavior of a shopper.

The present invention detects an incidence of a crowd during a predefined window of time and behavioral changes of shoppers in relation to the crowd. For example, in the exemplary incidence shown in FIG. 2, the present invention detects a crowd in a store area 133, i.e., in an aisle, where the store area is surrounded by shelves 181, using the images captured from the top-down camera(s) that cover the target measurement store area. The crowd is represented in a crowd bounding box 155 in the example. A shopper made a u-turn as an impact of the crowd in the store area 133, and the u-turn is detected by the present invention. The u-turn can be detected by observing the changes in the coordinates 443 of the shopper's path. For example, if the direction of the path reverses, such as along the y-axis in the coordinate system, the shopping path can be categorized as a u-turn movement. The number of u-turns is counted, and the total number of u-turns is associated with the crowd index by using regression analysis and elasticity is calculated. The total number of u-turns can also be used as one of the ways to calculate the crowd impact index, during the predefined window of time for the crowd impact measurement.

Figure 3:
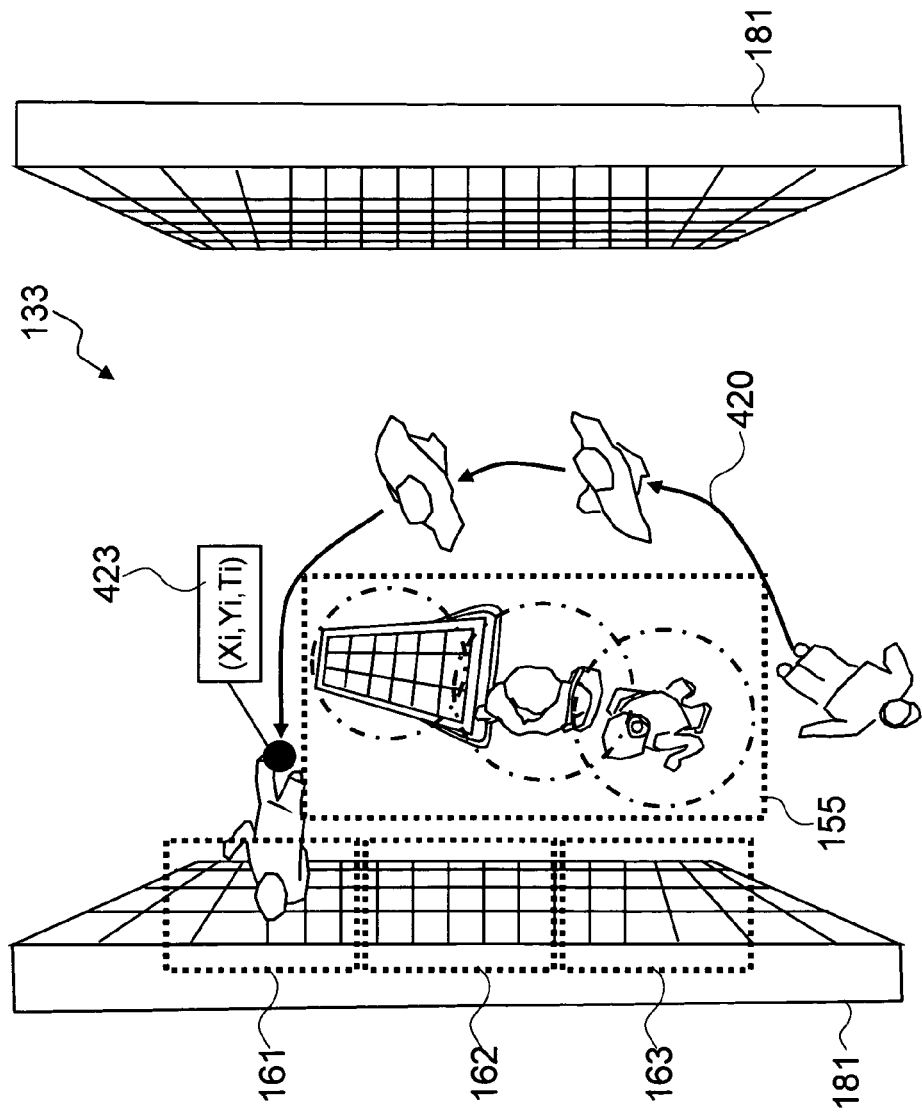
FIG. 3 shows another exemplary crowd impact on the behavior of a shopper.

FIG. 3 shows another exemplary crowd impact on the behavior of a shopper.

The existence of a crowd in the vicinity of categories may impact the performance of the categories by changing the shopping behavior and the path 420. Therefore, the category performance of a set of categories in the store area is measured as a crowd impact index, based on the shopping behavior changes of target shoppers in relation to the detected crowd.

In the example shown in FIG. 3, a set of bounding boxes for the categories, i.e., "physical space bounding box for category 1" 161, "physical space bounding box for category 2" 162, and "physical space bounding box for category 3" 163, are defined on the shelf in the store area 133. In the example, a shopper went around a crowd that occupied a space in the vicinity of the shelf, and the shopper made an interaction with a category in 161. The crowd is represented in a crowd bounding box 155 in the example.

In an exemplary embodiment, the shopper's purchase behavior for each category is counted in accordance with the location of the crowd, and the conversion rate is calculated as a measure of the performance of categories with regard to the crowd. For example, the crowd bounding box of the detected crowd is located in front of category 2 and category 3 in the example shown in FIG. 3. Therefore, in this example, the count for the purchase behavior by the target shopper is tagged as a purchase behavior caused by the crowd located in category 2 and category 3, and the overall such incidences are aggregated during a predefined window of time for the measurement. The aggregated data can be organized based on the level of crowd index and compared with the general count for the purchase behavior without the impact of the crowd. For example, the count of purchase, e.g., purhcaseCount(Cli), caused by the crowd, at a crowd index, e.g., Cli, during a predefined window of time, e.g., Ti, is compared with the other purchase counts with different levels of crowd indices (CIs) to establish the relationship, during the measurement window of time. It can also be compared with the purchase count without the crowd in the store area during another window of time.

FIG. 4 shows exemplary personal spaces that are used for crowd detection.

A definition of personal space is important to the detection of a crowd and the measurement of the crowd index. The personal space can be defined in various ways and shapes in the present invention. For example, exemplary shapes of personal space can comprise a circle 142, an oval, a rectangle 143, or an irregular polygon.

In an exemplary case, the personal space can be defined as an irregular circle, such as 141. The irregular circle 141 can be useful when the crowd measurement also needs to distinguish the front of shoppers from the back of shoppers, and considers the direction toward which the shoppers are facing in calculating the crowd index. This idea is based on the fact that, in general, people have larger radius of movement in the front than in the back.

However, it may be hard to implement the irregular circle 141 for various individuals, in an exemplary embodiment, due to the fact that the calculation involving the irregular circle may consume much more computing resource. In the personal space, there is always a possibility for a shopper to turn around in any direction, so the concept of front/back may be less relevant in this case.

The crowd space can be defined as an aggregation of the personal spaces of multiple shoppers. The region for the crowd can be defined not only with a tight boundary along the edge of the personal spaces in the crowd, but also with a crowd bounding box that includes the personal spaces of the persons in the crowd. Therefore, an approximation of a space that the shopper can reach in 360 degrees is sufficient as the definition of personal space in the embodiments.

The personal space may also dynamically change the shape or overlap with another object in the camera view, depending on the situation. For example, when a shopper is close to a shelf 181, the personal space may overlap 158 with a portion of the shelf in the captured image, and the overlapped portion of the personal space with the shelf will need to be adjusted, depending on the method of detecting and measuring the crowd. In an exemplary embodiment, the blocking by objects, such as a shelf, can be handled by applying the knowledge of the measurement space. For example, the portion can be ignored in the calculation of the crowd bounding box.

Figure 5:
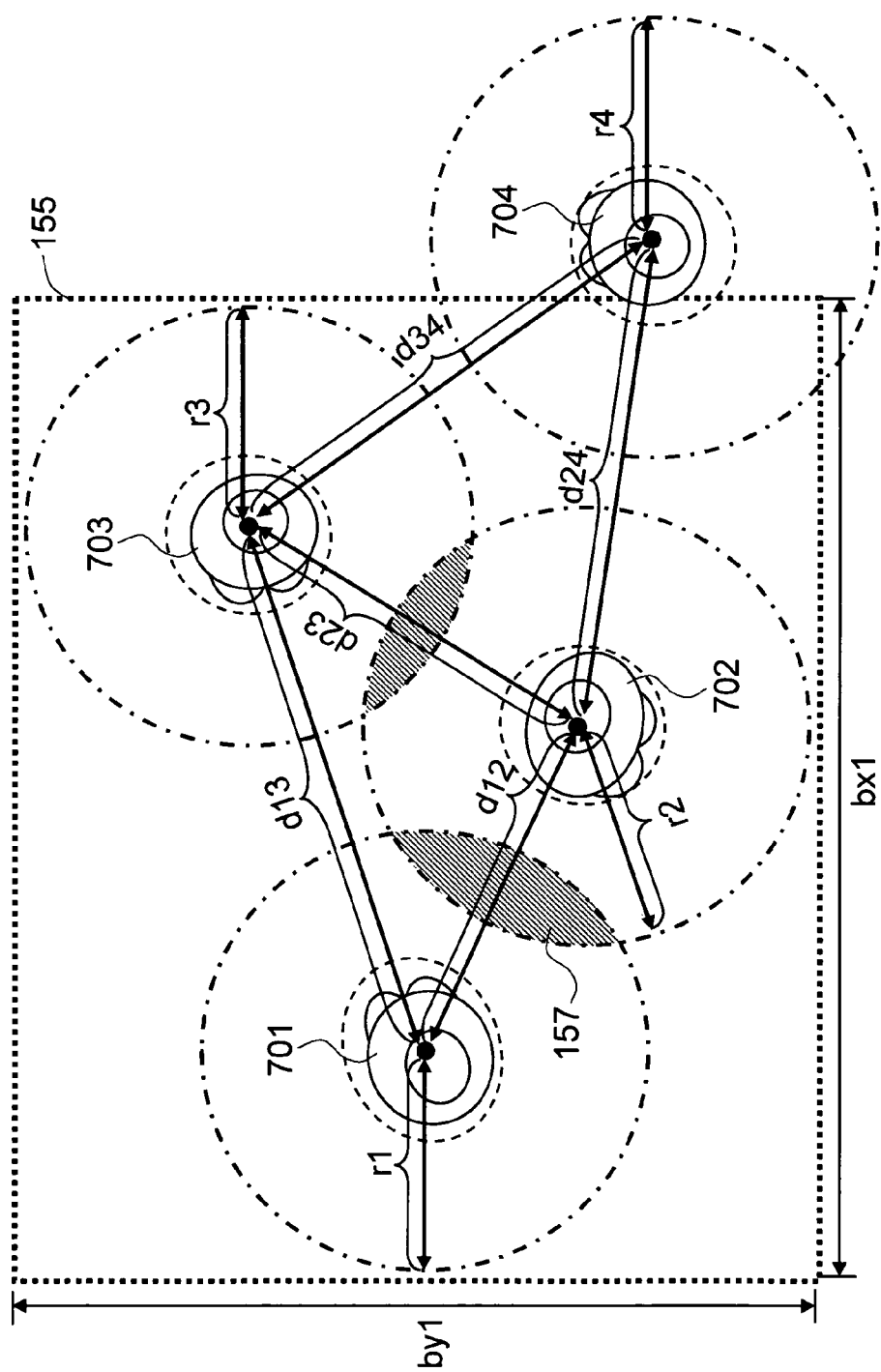
FIG. 5 shows an exemplary crowd detection.

FIG. 5 shows an exemplary crowd detection.

In an exemplary embodiment shown in FIG. 5, a personal space is defined as a circle centered on a shopper's position. The "r" is a predefined radius that determines the size of comfortable personal space, and therefore the diameter for a personal space is r*2.

If multiple persons appear in the measured store area, and the distance between two persons out of the multiple persons is less than or equal to a predefined minimum spatial length for longer than a threshold window of time, e.g., $T_{crowdthreshold}$, then it can be said that the two persons construct a crowd during the window of time. For example, the distance between "person 1" 701 and "person 2" 702 is less than or equal to the r1+r2, i.e., d12<=r1+r2 during a window of time, in the example. Therefore, it can be said that the "person 1" 701 and "person 2" 702 construct a crowd during the window of time.

The same proximity rule can be applied to the next person in the multiple persons. Therefore, if the distances from the next person to any of the persons, who are already added to the crowd, e.g., either of the first two persons, satisfy the proximity rule, then the next person is added to the crowd. However, if none of the distances from the next person to any of the persons that are already added to the crowd satisfy the proximity rule, then the next person is not added to the crowd. For example, the distance between "person 2" 702 and "person 3" 703 is less than or equal to the r2+r3, i.e., d23<=r2+r3, although the distance between "person 1" 701 and "person 3" 703 is not less than or equal to the r1+r3, i.e., d13>r1+r3 for longer than a threshold window of time, e.g., $T_{crowdthreshold}$, in the example. Therefore, the "person 3" 703 is added to the crowd. However, the distances between "person 4" 704 and any of the persons in the crowd is less than or equal to the sum of radii between the "person 4" 704 and each person in the crowd, respectively. Therefore, the "person 4" 704 is not added to the crowd.

It needs to be noted that if the size of "r" increases to satisfy the proximity rule for the "person 4" 704, then the "person 4" 704 can also be added to the crowd. Therefore, the present invention can adjust the granularity of the crowd detection by changing the size of "r". This is useful when the size of the measured store area varies. For example, for a narrower store area, the size of "r" may need to be decreased. The shaded area 157 represents the overlap among the personal spaces of shoppers.

The threshold for the duration of dwelling time for the persons in the crowd can also be adjusted in the determination of the crowd. For example, during busy hours of the day, the threshold may be shortened to accommodate for fast moving shoppers compared to other times of the day for relatively relaxed shopping movement.

The region for the crowd can be defined with a tight boundary along the edge of the personal spaces in the crowd or by a crowd bounding box 155 that includes the personal spaces of the persons in the crowd. "bx1" and "by1" show the size of the exemplary crowd bounding box 155 in FIG. 5. The crowd bounding box can handle linear stretch of the persons in the crowd in a flexible way. For example, even though there may be the same number of people in a crowd, the level of crowding could be different, depending on how the people are spatially located in the aggregation and how much space they occupy. As noted, if there is an overlap of personal spaces, the total space occupied by the crowd will be smaller than another crowd where the personal spaces of members do not overlap, even though the other crowd is composed on the same number of members. The value of the crowd index may also need to be adjusted when the members of a crowd are stretched linearly, even though there is the same number of members in the crowd. For example, if the crowd space is constructed across the store area and blocks the passage way, the crowd index may need to be increased in an exemplary case. In these cases, the crowd bounding box can be configured in a flexible way for the calculation of the crowd index. If multiple crowds are constructed in the store area, each crowd can be detected in the same manner as discussed above and, thus, multiple crowd regions are identified in the store area.

Figure 6:
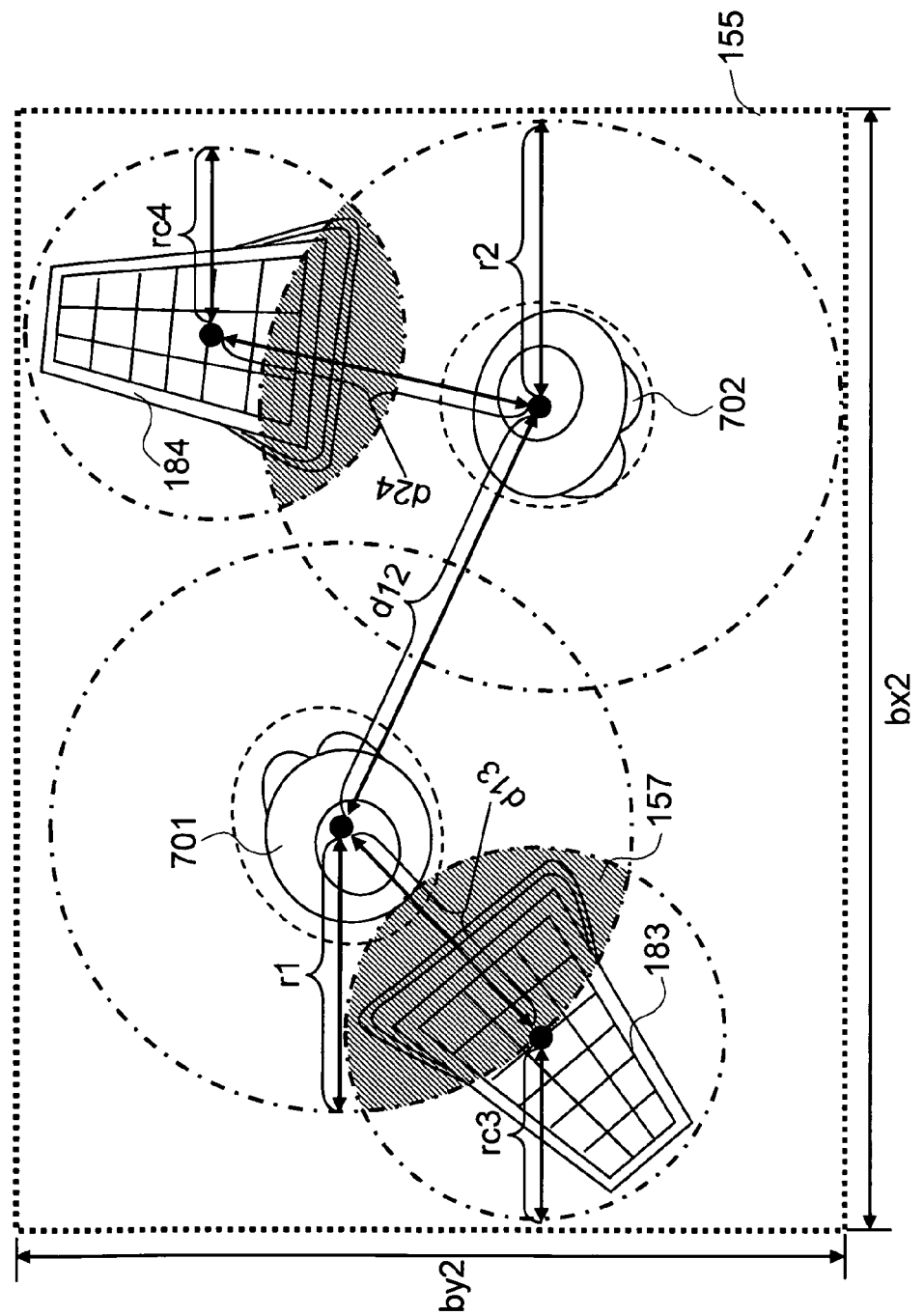
FIG. 6 shows an exemplary crowd detection with movable objects.

FIG. 6 shows an exemplary crowd detection with movable objects.

The detection of the crowd can be adjusted when the shoppers carry movable objects, such as carts or baskets. In the example shown in FIG. 6, "r1" and "r2" are predefined radii for comfortable personal space for the shoppers, e.g., "person 1" 701 and "person 2" 702, and "rc3" and "rc4" are predefined radii for space occupied by movable objects, e.g., 183 and 184.

Although the size of the movable objects' projected image views may be bigger than a shopper's, they do not have peripheral attachment that can be physically extended farther, such as human arms and legs. They also do not have other human factors, such as emotion and personal perception for a minimum personal space. Therefore, the radii for them can be set smaller than those for shoppers.

When a shopper carries a movable object, the maximum length for the occupied space, i.e., $\text{MaxLength}_{os}$, by the shopper and the movable object can be defined as follows:

$$\text{MaxLength}_{os} = ri + dij + rcj \tag{3}$$

where "ri" is a radius for a shopper's personal space, "rcj" is a radius for the occupied space by a movable object, and "dij" is a predefined maximum distance between the shopper and the movable object.

Therefore, the maximum length for the occupied space for the "person 1" 701 with a movable object 183 is r1+d13+rc3 in the example shown in FIG. 6. The "dij" can be "ri+rcj" in general. However, the size of "dij" can be adjusted depending on the type of movable object and other conditions, such as the size of the store area. Therefore, by defining the "dij" dynamically, the present invention can provide flexibility in calculating the size of a crowd when movable objects are involved.

Once the maximum length for the occupied space by the shoppers and their movable objects are defined, a proximity rule can be applied to detect the crowd. If multiple persons with movable objects appear in the measured store area, and the distance between two persons out of the multiple persons is less than or equal to a predefined minimum spatial length for longer than a threshold window of time, e.g., $T_{crowdthreshold}$, then it can be said that the two persons construct a crowd during the window of time. For example, the distance between "person 1" 701 and "person 2" 702 is less than or equal to the r1+r2, i.e., d12<=r1+r2, during a window of time, in the example. Therefore, it can be said that the "person 1" 701 and "person 2" 702 construct a crowd during the window of time. The same proximity rule can be applied to the next person in the multiple persons.

In addition, a similar proximity rule can be applied to the movable objects to calculate the size of a crowd based on the distance between the shoppers and the movable objects. For example, if the distances from a movable object to any of the persons, who are already added to the crowd, satisfy the proximity rule, then the space occupied by the movable object is added to the calculation of the crowd size and the space occupied by the crowd.

The region for the crowd can be defined with a tight boundary along the edge of the personal spaces in the crowd and movable objects. In another exemplary embodiment, the region for the crowd can be defined by a crowd bounding box 155 that includes the personal spaces of the persons in the crowd and the spaces occupied by the movable objects. "bx2" and "by2" show the size of the exemplary crowd bounding box in FIG. 6. As shown in the example, the crowd bounding box size can be affected by the movable objects. The shaded area 157 represents the overlap between the personal spaces of shoppers and movable objects.

Figure 7:
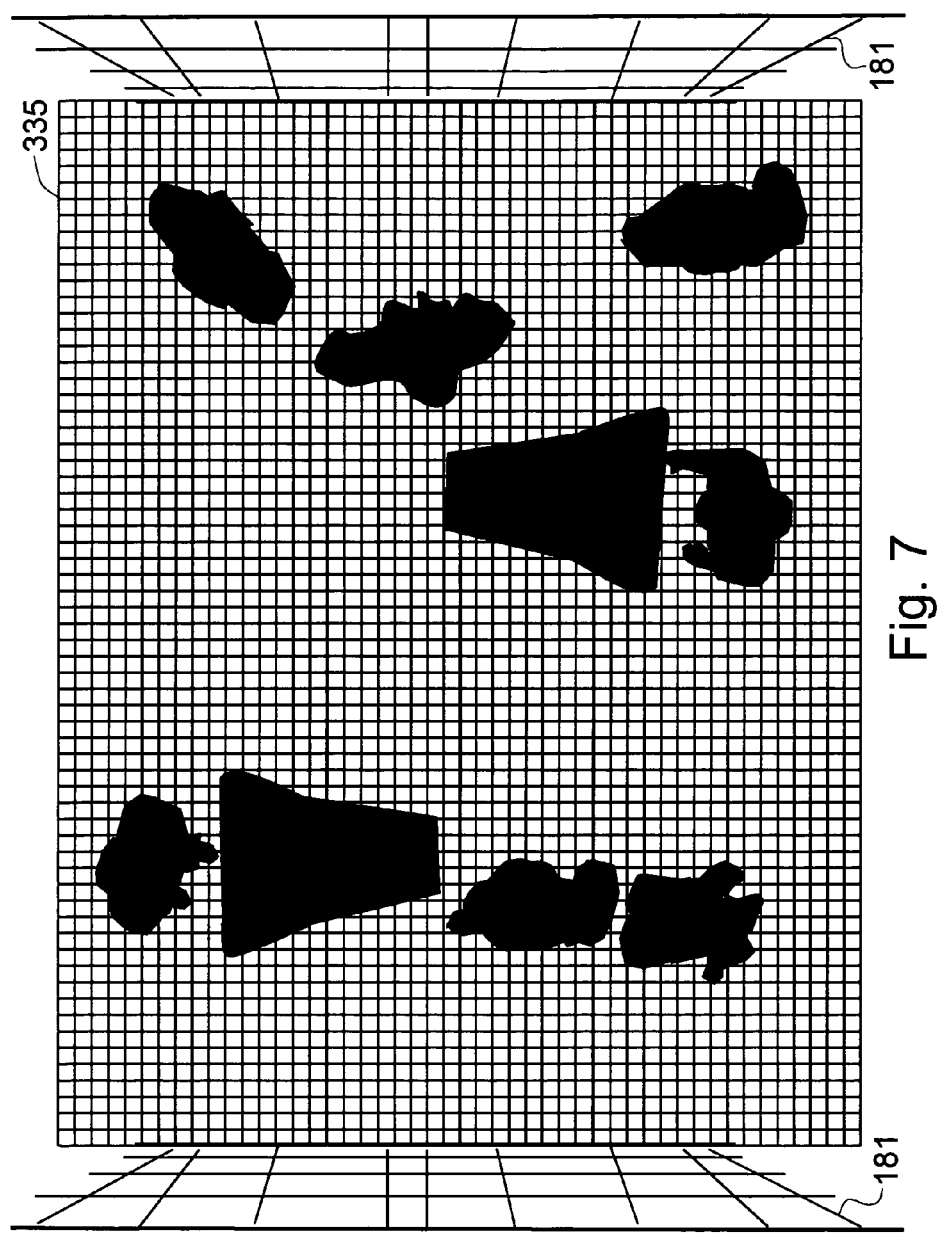
FIG. 7 shows another exemplary crowd detection.

FIG. 7 shows another exemplary crowd detection.

In another exemplary embodiment, the present invention can utilize the blob size of the crowd and the accompanied movable objects to detect the crowd and calculate the crowd index.

The process utilizes a background subtraction algorithm among a set of image frames to detect the blobs of people and the accompanied movable objects during a window of measurement time for the crowd detection. The sum of pixels that are occupied by the foreground objects can be defined as the size of blobs. In order to remove noises, a threshold is used for the minimum size of a blob. In FIG. 7, the exemplary grid shows an exemplary 2D array of pixels 335 for a 640×480 image scaled by 10, so each grid element is 10×10 pixels. The process scans the rows and columns, and counts the number of pixels that are occupied by the foreground objects. Adjacent blobs are grouped together. If the average size of the group of blobs during the window of measurement time satisfies a crowd detection criterion, such as the size of the group of blobs is greater than or equal to a threshold, the present invention identifies the group of blobs as a crowd.

The crowd size, e.g. $\text{crowdsize}_{blob}(C_i)$, can be defined based on the average of the group of blob sizes over a measurement period, where a blob is a set of the pixels that are occupied by a member of the crowd and the accompanied movable objects, and the crowd is a group of blobs, as follows:

$$\text{crowdsize}_{blob}(C_i) = \frac{\sum_{i=1}^{n} \text{numPixels}(fi)}{\text{numFrames}_{T_w}} \tag{4}$$

where $f_i$ is an image frame during the window of time Tw, $\text{numPixels}(f_i)$ is the total number of pixels in the $f_i$ covered by the crowd Ci during a window of measurement time Tw, and $\text{numFrames}_{TW}$ is the number of frames during the window of time Tw.

If multiple crowds exist in the store area, the crowd size can be calculated for each crowd, i.e, each group of blobs.

Based on the crowd size, the crowd index, e.g. $\text{CI}_{blob}$, can be defined as a ratio of the crowd size over the maximum number of pixels in the image frames during the window of measurement time, as follows:

$$CI_{blob} = \frac{\sum_{i=1}^{Nc} \text{crowdsize}_{blob}(C_i)}{\text{numPixels}_{max}(f_i)} \tag{5}$$

where $C_i$ is a particular crowd incidence by a group of people during a window of measurement time Tw, $\text{crowdsize}_{blob}(C_i)$ is the average size of the crowd $C_i$ based on blob sizes, Nc is the number of crowds in the measurement store area, $f_i$ is an image frame during the window of time Tw, and $\text{numPixels}_{max}(f_i)$ is the maximum number of pixels for the $f_i$.

The region for the crowd can be defined with a tight boundary along the edge of the blobs. In another exemplary embodiment, the region for the crowd can be defined by a crowd bounding box that includes the blobs.

Figure 8:
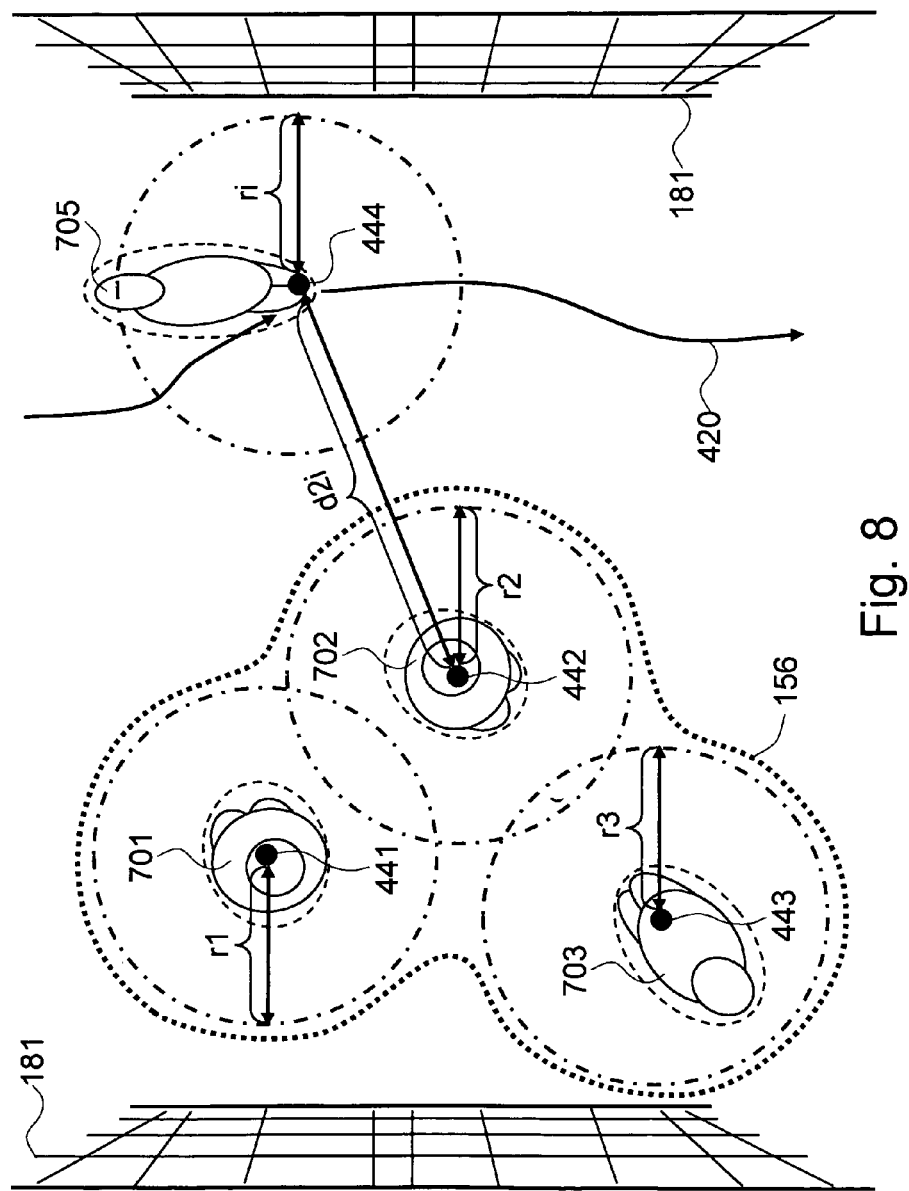
FIG. 8 shows an exemplary crowd impact measurement using a tight crowd boundary.

FIG. 8 shows an exemplary crowd impact measurement using a tight crowd boundary.

As discussed, aggregation of personal spaces that satisfy the proximity rule during a predefined window of time can construct a crowd region. Once a crowd region is identified, the crowd impact on target shoppers, e.g. passers-by, can be calculated by analyzing the paths of the target shoppers in an exemplary embodiment. In the example shown in FIG. 8, "person 1" 701, "person 2" 702, and "person 3" 703 construct a crowd, and a target shopper 705 is making a trip through an aisle area.

In an exemplary application of the present invention, the count for the passers-by during the measurement window of time can be compared to the average count for the shoppers who made purchases in the aisle during another window of time when a crowd did not exist. The comparison can provide information of how many people's purchase behavior were impacted or deterred by the crowd.

The distance from the target shopper 705 to the crowd can be measured using a tight crowd boundary 156. For example, in the example shown in FIG. 8, a tight crowd boundary 156 is approximated along the circumferences of the personal spaces. The "d2i" shows the distance between "the coordinate (xi,yi) of center point of a rightmost shopper who belong to a crowd" 422 and "the center point of a target shopper track" 424. The impact of the crowd can be measured as a spatiotemporal analysis. For example, if "d2i" is less than or equal to a spatial threshold, such as "r2+ri" for longer than a predefined temporal threshold, then it can be said that there is influence of crowd to the target shopper. The data of the target shopper's shopping behavior is accumulated and used to analyze a further impact of the crowd. For example, if the target shopper made a purchase in the aisle area, the purchase count during the crowd impact is incremented and compared with the purchase count without the crowd in different times. The velocity change of the target shopper can also be measured to see how the shopper responds to the crowd in speed.

In an exemplary embodiment, from another point of view, it needs to be noted that the target shopper may or may not be added to the crowd, depending on whether the target shopper satisfies the crowd construction criteria. For example, in the same example, the target shopper may appear for less than the duration for a crowd threshold window of time, e.g., $T_{crowdthreshold}$. In this case, the target shopper may not be added to the crowd, even if the target shopper's position may satisfy the proximity rule for the crowd. However, if the shopper stays in the area for longer than a threshold window of time, e.g., $T_{crowdthreshold}$, for the crowd construction and satisfies the proximity rule for the crowd, the target shopper may be added to the crowd as a new member.

Figure 9:
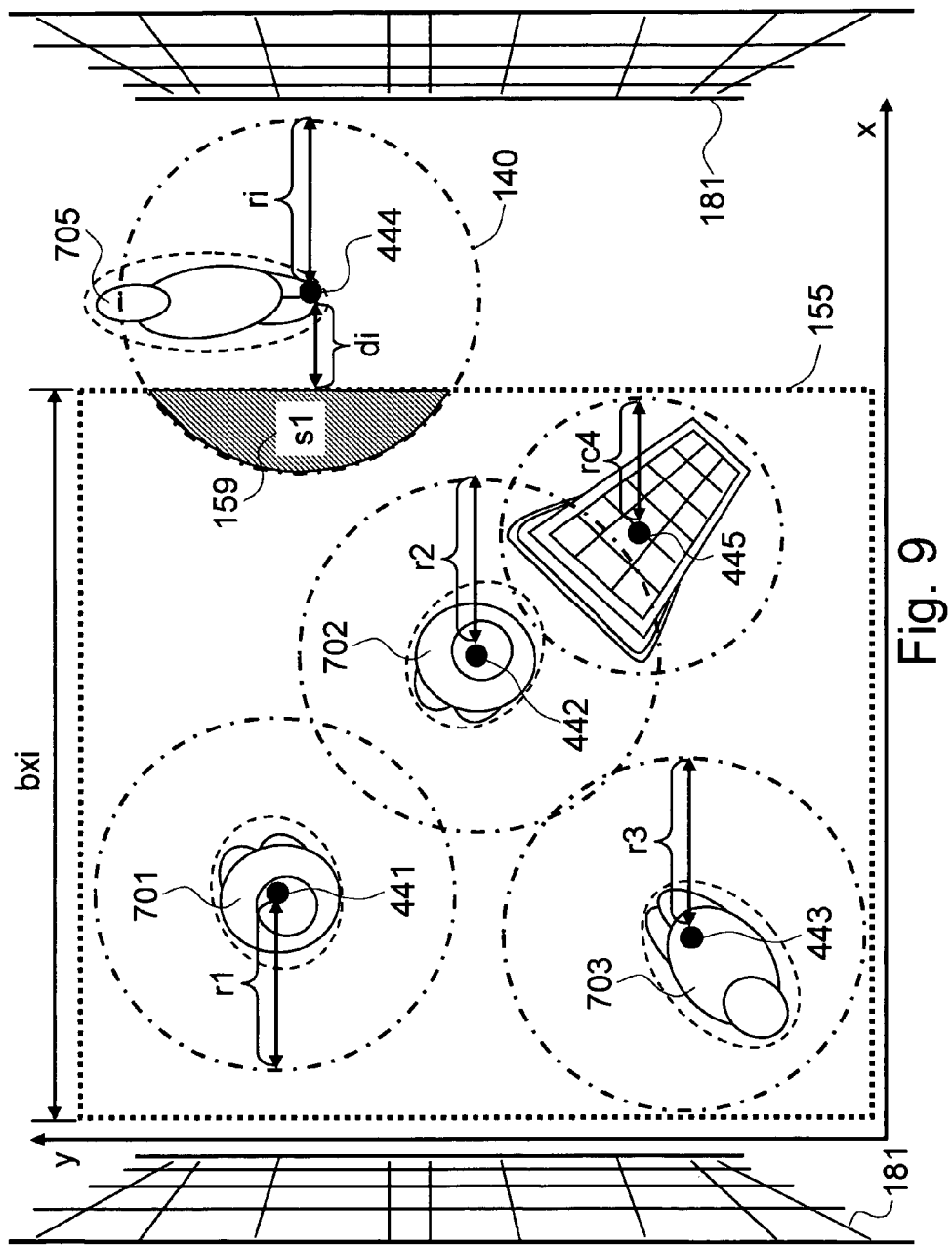
FIG. 9 shows an exemplary crowd impact measurement using a crowd bounding box.

FIG. 9 shows an exemplary crowd impact measurement using a crowd bounding box.

In another exemplary embodiment, the impact of the crowd can be measured using a crowding bounding box 155. If a shopping path is impacted by a crowd in an aisle area, the value on a horizontal axis perpendicular to the direction of the passageway in the aisle, e.g. x-axis in FIG. 9, shows a variation in correlation with the location of the crowd. Therefore, a rectangular bounding box can be an efficient tool to measure the impact of a crowd in this situation, by simply calculating the difference in x-axis rather than calculating the Euclidean distance between the target shopper and the outermost shopper. For example, if bxi+di<=bxi+ri, then it can be said that there is influence of crowd in the example shown in FIG. 9.

In this method, "s1" 159 shows the area of intersection between the crowd bounding box and the personal space of a target shopper. The average size of intersection "s1" for a predefined measurement period may be used as the degree of crowd impact on the target shopper.

Figure 10:
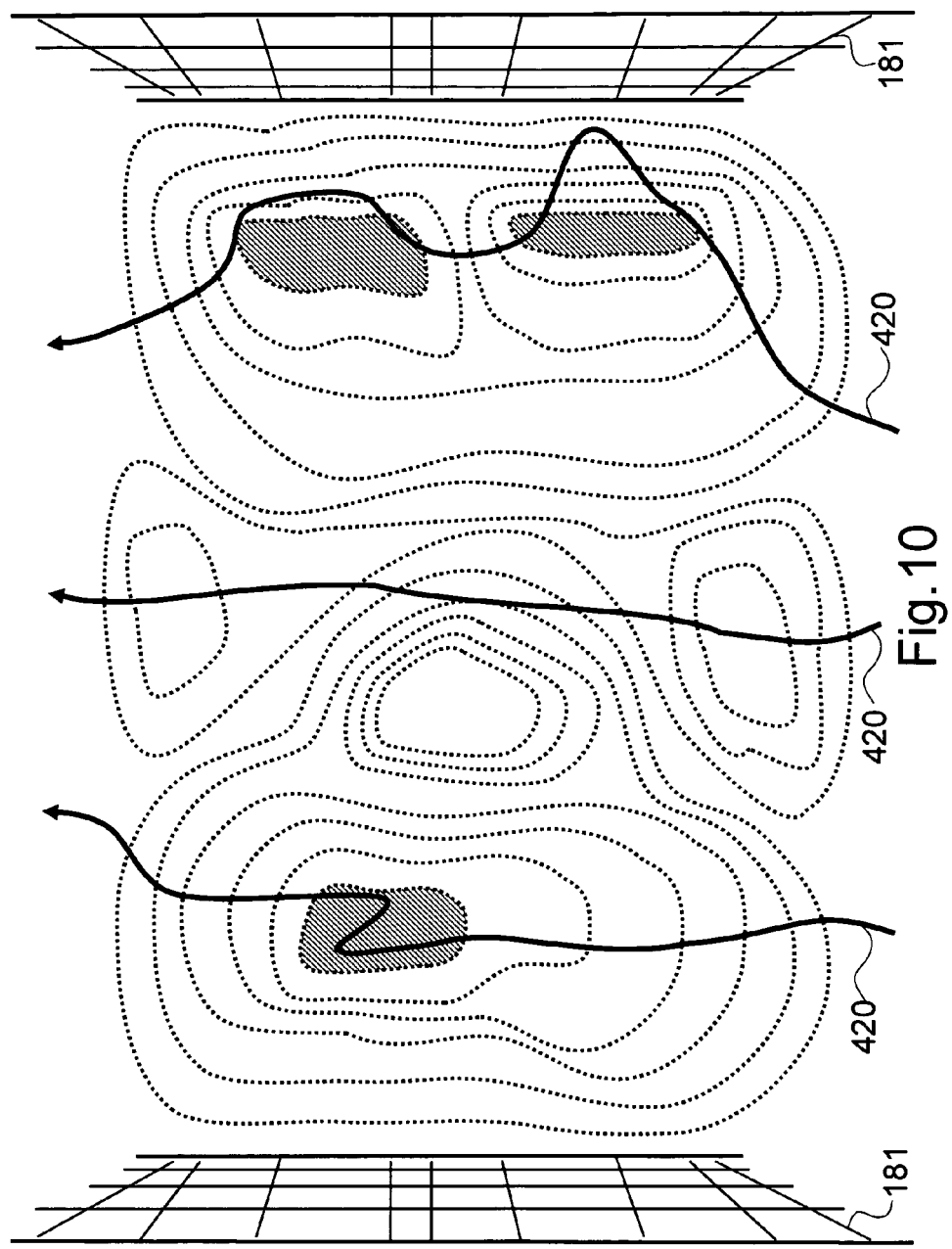
FIG. 10 shows an exemplary crowd density map construction based on accumulated coordinates of shopper tracking.

FIG. 10 shows an exemplary crowd density map construction based on accumulated coordinates of shopper tracking.

The present invention can accumulate the tracking 420 information of shoppers in a measured store area and generate a density map. The density map shows which sub-area, e.g., the hatched areas in FIG. 10, in the measured store area is prone to crowding. The information can be used to optimize the location of categories and products and the store layout.

In the exemplary density map shown in FIG. 10, the coordinates of tracking 420 are accumulated in the measured store area over a predefined measurement period, and the pixel locations with the same frequency are joined together to form a contour line. In the contour map, the inner contour line shows a higher density of crowding over the measurement period. In an application that uses the density map, the location of categories and products can be determined according to the highest density location of crowding, e.g., the hatched area. For example, promotional items from a category can be placed in the vicinity of the highest density location of crowding to attract the shoppers in an incidence. On the other hand, the promotional items can be located in a less crowded location to avoid the neighboring crowds for competing items and to disperse the traffic of shoppers in the target store area, thus controlling the crowd navigation, in another approach for layout planning.

The accumulated coordinates of shopper tracking over a period of time can also be used to measure the relationship of the crowd index and crowd impact index with purchase movement between premeditated purchase movement and impulse purchase movement. For example, the accumulated coordinates of shopper tracking over a period of time in the target store area will show a statistical pattern of shopping movement for a set of categories in the target store area, and it is assumed that the pattern represents the premeditated shopping for the particular categories in this example. If a newly formed crowd during a specific time period affects and changes the pattern of shopping movement by the shoppers for the particular time period, the changed shopping movement can be detected as impulse purchase movement in comparison to the accumulated shopping tracking information which might have been constructed based on predetermined shopping on previous occasions. For example, the sales for a regularly purchased item in a category can decrease while the sales for alternative items in another category may increase during the time a crowd exists in the vicinity of the decreased sale item in the store area. The relationship between the crowd index and the sales change can be correlated in this example.

Figure 11:
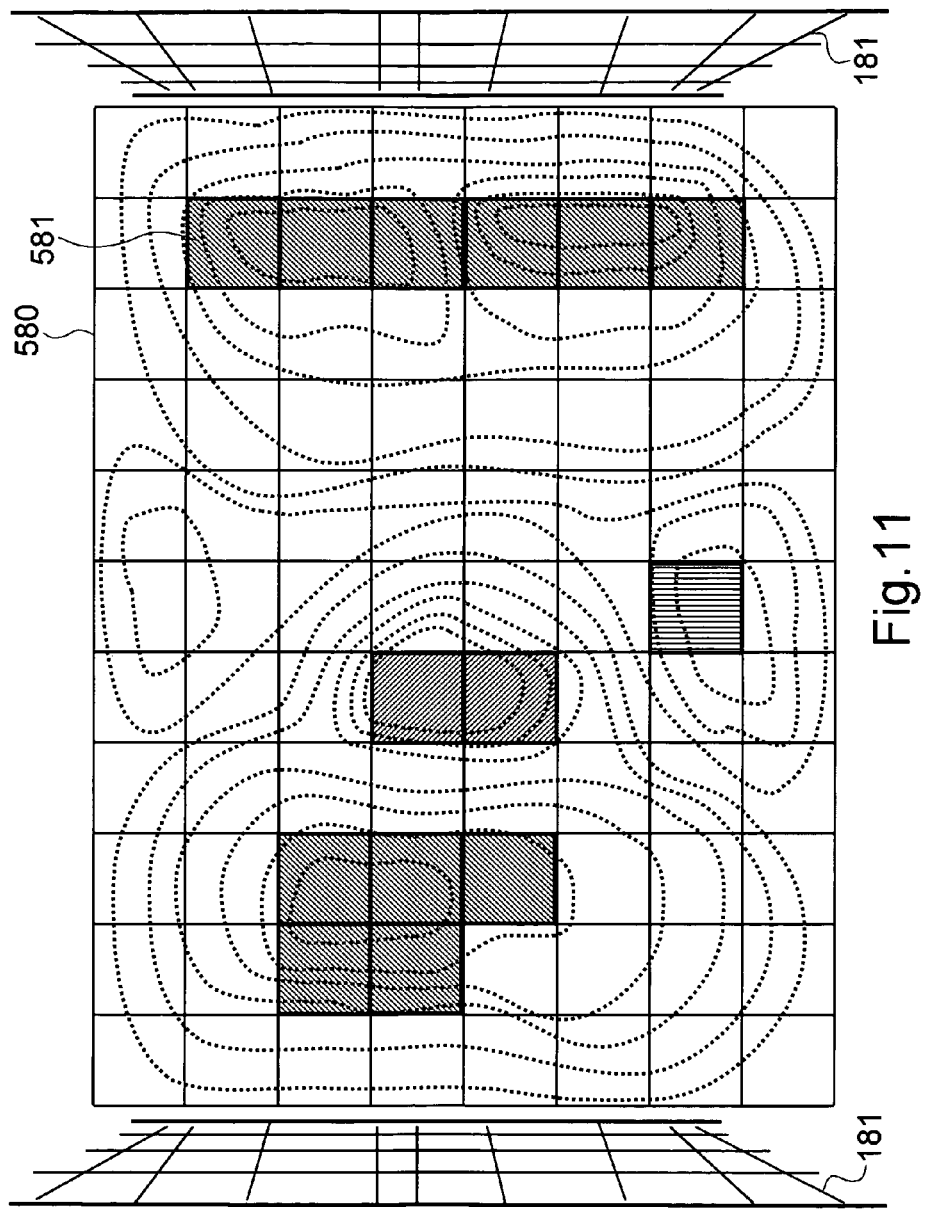
FIG. 11 shows an exemplary density map and grid that are used to calculate the crowd index.

FIG. 11 shows an exemplary density map and grid that are used to calculate the crowd index.

In an exemplary embodiment shown in FIG. 11, the present invention counts the number of shoppers per unit, such as a foot of shelf space, in the store area, at a given instance of crowding in the store area. In an exemplary process, a grid 580 is applied along with the density map to normalize the size of the crowd and the number of shoppers per unit. The size of a grid element 581 in the grid 580 can be predefined in relation to the store area. For example, the size of a grid element side can be a foot.

Different sizes of shoppers occupy a different number of grid elements. Therefore, using the grid helps the present invention to differentiate shoppers based on their sizes, rather than the number of members in the crowd.

Figure 12:
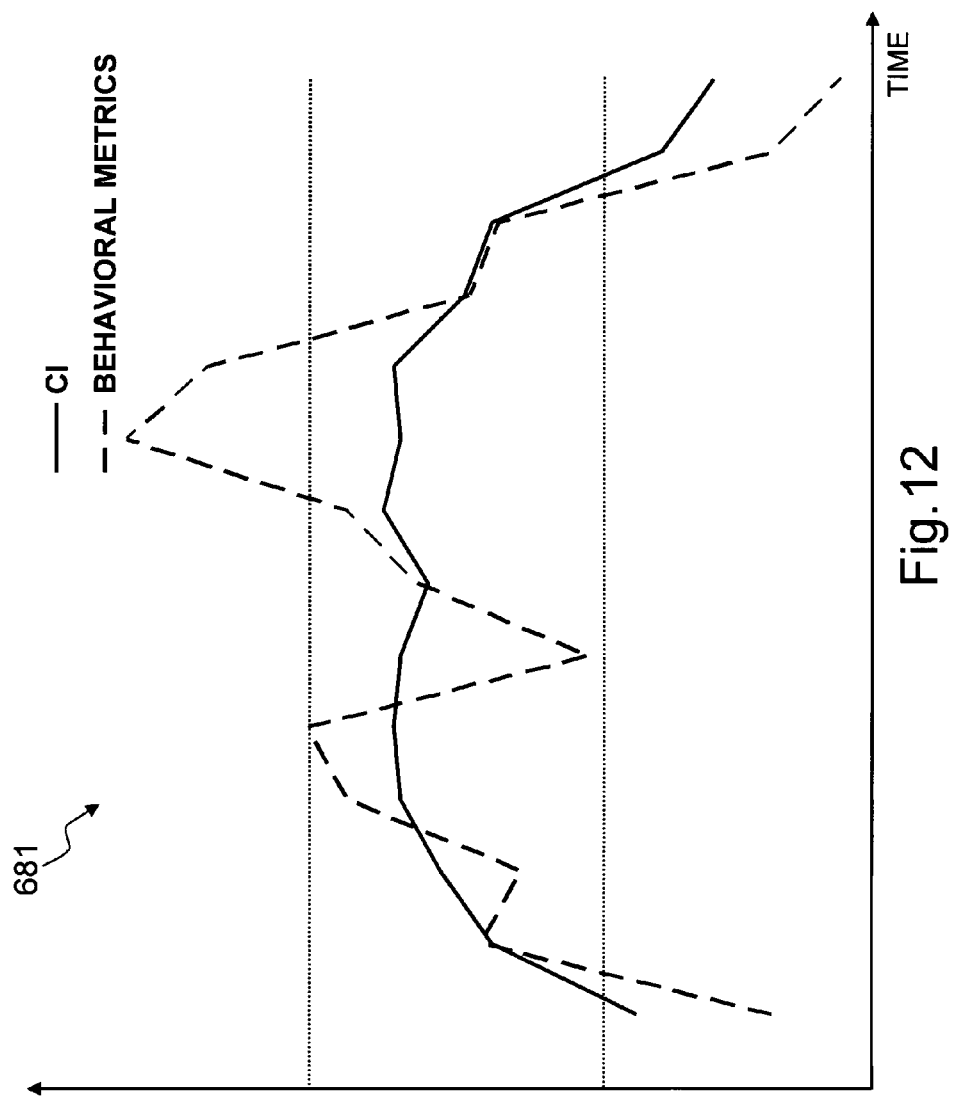
FIG. 12 shows an exemplary graph plotting behavioral metric (BM) and the crowd index (CI) over time.

FIG. 12 shows an exemplary graph for the relationship between the crowd index (CI) and behavioral metrics (BM).

The behavioral metrics may or may not be impacted by CI. The relationship will depend on the type of products in the store area, shopping occasion, trip type, etc. In order to quantify the relationship between CI and BM, the present invention collects data over a period of time, and establishes the relationship between CI and BI using statistical analysis. The system measures the correlation coefficient between them to establish a causal relationship which ranges between −1 (perfect negative correlation) and +1 (perfect positive correlation). The present invention also conducts regression analysis to measure the elasticity coefficient of change in BM due to change in CI. The elasticity coefficient is calculated at the given level of BI and CI, and may change at different levels of BI. The measurement will have an unlimited range, but the sign will always be the same as the correlation coefficient.

Figure 13:
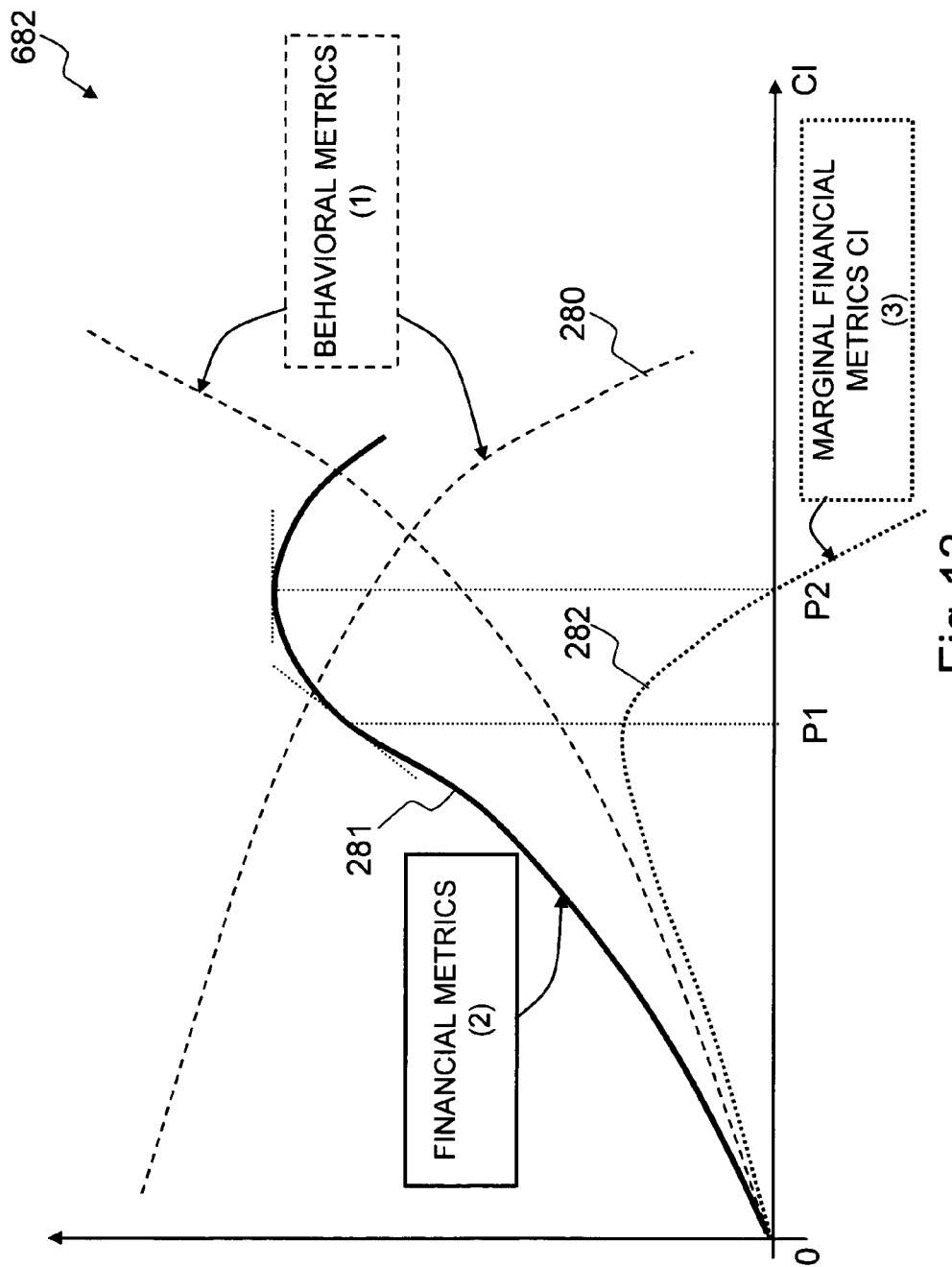
FIG. 13 shows an exemplary graph showing the relationship of the crowd index with behavioral and financial metrics.

FIG. 13 shows an exemplary graph for variation in BI with change in CI. The X-axis represents CI, and the Y-axis can represent the different levels for BI.

The line—Behavioral Metrics (1) 280—plots a given BI against Ci. The rate of change of BI with respect CI at any point represents the elasticity. It can be positive, negative or flat. For example, the number of u-turns per hour will be positively correlated to CI, whereas the average shopping duration will be negatively correlated.

Since the presence and behavior of a crowd may impact the behavior of each member in the crowd or the target shoppers' behavior, the BI can also be defined and measured from the perspective of the crowd members' behavior or the target shoppers' behavior impacted by the crowd's presence. For example, when the crowd index becomes larger, the sales by crowd may increase, i.e., the rate of BI (as the sales by crowd) positively changes, while the sales by the target shoppers may decrease, i.e., the rate of BI (as the sales by the target shoppers) negatively changes due to the blocking by the crowd.

Change in BI may not lead to immediate change in sales performance, but may impact long term benefits, since a poor shopping experience can prompt shoppers to defect to other retailers.

The line—Financial Metrics (2) 281—plots a given financial metric, such as total category sales and conversion rate—against CI. Most financial metrics will follow a similar curve.

The line—Marginal Financial Metrics (3) 282—plots the incremental increase (or decrease) in (2) which change in BI. Marginal change is defined as the incremental change in financial performance due to a unit change in CI (also defined as the slope of curve 2 at that given pt).

P1 is the highest point on the curve (3). This is the first point of inflection; until this point, the additional sales per buyer is higher than the sales for existing buyers. This takes care of the perception that a larger crowd indicates great deals.

If the CI in the store area is less than P1 then the area is undercapitalized, and the retailer should try to increase CI. P1 is also the optimum level for CI.

P2 is the point where curve (3) reaches 0. This is the second point of inflection; until this point additional traffic coming into the store area was leading to additional sales, but beyond this point additional traffic is preventing shoppers from making purchases.

If the CI in the store area is more than P2, then the area is overcrowded, and the retailer should try to reduce CI. The retailers' strategy should be to keep CI between P1 and P2.

FIG. 14 shows exemplary tables for the crowd index for a store area over different time periods.

In the related FIG. 7, the present invention disclosed an idea of calculating the crowd index based on the crowd size that was defined based on the average of the group of blob sizes over a measurement period. In FIG. 7, the crowd index was defined as a ratio of the crowd size over the maximum number of pixels in the image frames during the window of measurement time.

In addition to this, the exemplary tables 621 and 622 in FIG. 14, use different exemplary approaches to calculate the crowd index (CI) for a store area Si over different time periods.

The number of shoppers in a crowd during a specific time period can increase or decrease. In the beginning of the crowd detection, there may not be any shoppers in the measured store area, and then the number of shoppers may increase as time passes. On the other hand, the number of shoppers may decrease during the same measurement time period. The maximum number of shoppers that formed a crowd during a specific time period may be different from those of other time periods. For simplicity, the crowd size and index are "0" when there is less than or equal to one shopper in the store area at a given measurement time period. Therefore, the crowd size and the crowd index during the measurement time period can vary. For example, the number of shoppers at time period "T1" changed between "2" and "4" in the exemplary "table 1" 621 shown in FIG. 14. The maximum number of shoppers in a crowd during the time period of T3 was "3".

In FIG. 14, the crowd size can be defined either by 1) the number of shoppers in the grid of a store area, or 2) the number of grid elements that are occupied by the shoppers and movable objects rather than the number of shoppers.

If the approach 1) is applied in the crowd index calculation, the crowd index stays the same for the same number of shoppers during the time periods. In exemplary "table 1" 621 shown in FIG. 14, the number of shoppers is divided by the size of the grid 580, shown in FIG. 11, and the crowd index stays the same for the same number of shoppers throughout all of the time periods. For example, the second row shows that there were "2" shoppers in an incidence during the time period of T1 and, thus, the crowd index is calculated as 2/88≈0.02, where the exemplary grid size is 88 in the incidence. The result is rounded for simplicity. In the same manner, if there were "3" shoppers in another incidence during the time period of T1, the crowd index is calculated as 3/88≈0.03 in that particular incidence, in the example. The same number of shoppers regardless of time periods, i.e., from T1 to Tm, will result in the same crowd index for the crowd incidences during each time period. For example, the crowd index in time period T2 is the same as the crowd index at other time periods if there is the same number of shoppers in crowd incidences.

However, if the approach 2) is applied in the crowd index calculation, as shown in "table 2" 622, the crowd index can vary depending on the spatial size of the shoppers. If more grid elements are occupied by the shoppers during a specific time period, the crowd index may increase, even though the number of shoppers is the same, compared to the other time periods. For example, the rows for "2" shoppers, i.e., Ni=2, in "table 2" 622 show that the crowd indices are different at different time periods of T1, T2, and T3 although there were the same number of shoppers in each crowd incidence, because the shoppers occupied a different number of grid elements in each incidence. The crowd index is "0.09", e.g., 8/88≈0.09 in a crowd incidence of "2" shoppers in time period of T1, and the crowd index is "0.11", e.g., 10/88≈0.11 for another crowd incidence of "2" shoppers in time period of T2, and the crowd index is "0.13", e.g., 11/88≈0.13, for another crowd incidence of "2" shoppers in time period of T3, where the number of grid elements that are occupied by the "2" shoppers is 8, 10, and 11 for each incidence at different time periods, respectively. The result is rounded for simplicity.

The length of a grid element side can also be defined in various ways. For example, it can be defined according to 1) the average shopper size in the store area, 2) a foot, or 3) a radius "r" that was used to define a personal space.

The crowd index (CI) can be determined based on the crowd size over different time periods as follows:

$$CI = \frac{crowdsize(C)}{\max CrowdSize(S)} \quad (6)$$

where crowdsize(C) is the size of the detected crowd "C" and maxCrowdSize(S) is the maximum of the crowd size in the store area, which can be the predefined maximum number of people who can occupy the store area or the maximum number of grid elements for a grid in the store area.

As discussed, the CI changes according to the crowd size in a given measurement time period.

If multiple crowd regions are constructed in the store area, each crowd index for each crowd region can be calculated, and then the overall crowd index ($CI_{overall}$) can be calculated as the sum of the crowd indices, defined as follows:

$$CI_{overall} = \sum_{i=1}^{n} \frac{crowdsize(C_i)}{\max CrowdSize(S)} \quad (7)$$

where $CI_{overall}$ is the overall crowd index of the store area, and maxCrowdSize(S) is the maximum of the crowd size in the store area, which can be the predefined maximum number of people who can occupy the store area or the maximum number of grid elements for a grid in the store area.

FIG. 15 shows an exemplary table for the number of impacted behaviors by a crowd in a store area and a table for crowd impact index for the store area over different time periods.

A behavior index is calculated based on the measurement of certain behaviors in the measured store area. The target behaviors can vary, depending on the goal of the crowd impact and elasticity measurement. As discussed, since the presence and behavior of a crowd may impact each other's behavior in the crowd or the target shoppers' behavior, the BI can also be defined and measured from the perspective of the crowd members' behavior or the target shoppers' behavior impacted by the crowd's presence.

With regard to FIG. 15, for example, the number of u-turns can be counted in relation to the crowd size in the store area. In this exemplary behavioral change measurement for the u-turns, as shown in "table 3" 623 in FIG. 15, the behavior index can simply be the count for the u-turns in a given measurement time period. In "table 3" 623, each value of row "Ci" and column "Tm" indicates the number of measured behaviors, such as u-turns, for a store area for the time period of "Tm" in relation to the crowd index "Ci". In another example, the category performance change in the store area can be measured as the behavioral change of the shoppers that is impacted by a crowd. In this case, the behavior index can be calculated based on the changes in the shopper conversion rate, such as ratio of purchaser vs. viewer or prolonged duration of time for shopping, during the given measurement time period.

In an exemplary process, the crowd impact index (CII1) is defined as follows:

$$CII1 = BI*CI \quad (8)$$

where BI is a behavior index and CI is a crowd index during a measurement window of time.

As an example, the "table 4" 624 shows an exemplary crowd impact indices for a store area Si over different time periods. In "table 4" 624, each value of row "Ci" and column "Tm" indicates the calculated crowd impact index for a store area for the time period of "Tm" in relation to the crowd index "Ci". The second row of the table shows that the crowd impact index is "0.09" for crowd index "C2" at time period of "T1", "0.34" for crowd index "C2" at time period of "T2", "0.25" for crowd index "C2" at time period of "T3", and so on. If multiple local crowds exist in the store area, the CI can be an overall crowd index of the store area, such as the "$CI_{overall}$", as discussed earlier.

In another exemplary process, the crowd impact index, e.g., can also be defined as follows:

$$CII_{Ti} = \frac{CI_{Ti}}{\log_b(NumOfShoppers(T_i)) + c}, \quad \text{if } NumOfShoppers(T_i) >= 1, \quad (9)$$

$$c > 0$$

$$CII_{Ti} = 0, \quad \text{if } NumOfShoppers(T_i) = 0$$

where $CI_{Ti}$ is a crowd index, NumOfShoppers($T_i$) is the count of shoppers, excluding the members in the crowd, during a time period of "$T_i$" at the store area for the crowd impact measurement, "b" is a predefined base for the logarithm, and "c" is a predefined constant.

In this approach, the crowd impact is measured by the change in the number of shoppers in the store area during the measurement period.

Figure 16:
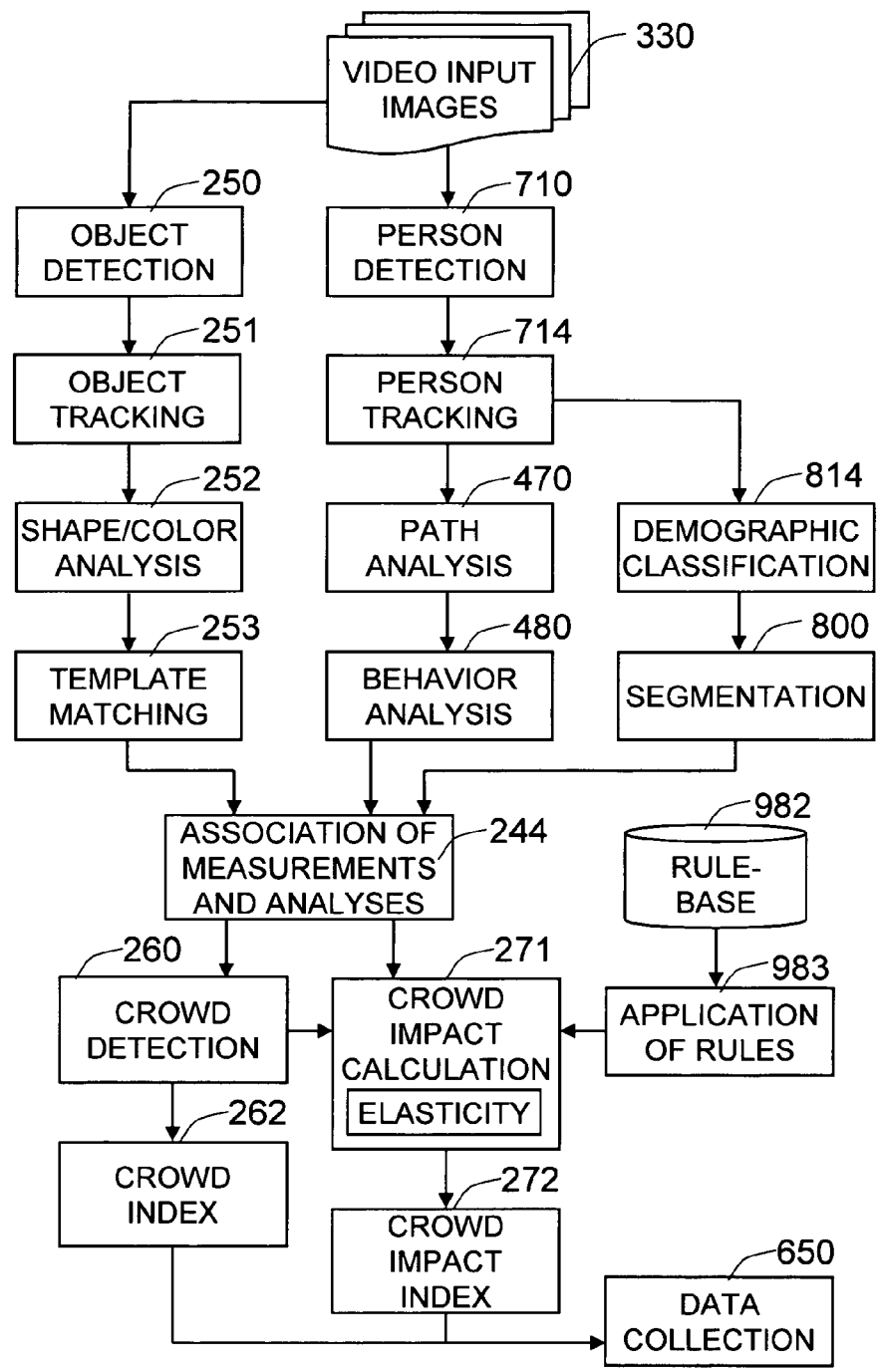
FIG. 16 shows exemplary processes for the measurement of the crowd index and elasticity, e.g., crowd impact index, in which computer vision-based behavior analysis and segmentation measurement, i.e., demographics measurement, are associated in an exemplary embodiment of the invention.

FIG. 16 shows exemplary processes for the measurement of the crowd index and the crowd impact index, in which computer vision-based behavior analysis and segmentation measurement, i.e., demographics measurement, are associated in an exemplary embodiment of the invention.

The present invention comprises modules of:
automatic behavior measurement and analysis,
automatic demographics measurement and analysis,
object detection and tracking,
association of the measurements and analyses, and
calculation of the crowd index and the crowd impact index based on the analysis of the measurement.

In a preferred invention embodiment, the present invention processes the video-based analysis automatically. The analysis includes behavioral measurement and measurement of segment information, such as demographics. The measurement can be performed in a sample of store areas, and the crowd impact measurement can be extrapolated to other store areas.

In an exemplary embodiment, the present invention can measure the crowd impact in relation to each demographic segment. Demographic segmentation can be used to identify the impact of a crowd on specific shopper segments. The segmentation comprises demographic segments and trip type analysis of the shoppers. Examples of attributes that are used to classify the demographic segments include age range, gender, and ethnicity. Examples of typical trip types are—stock-up, fill-in, quick trip, occasion-based. Stock-up trips are shopping trips in which people visit a large number of store areas, spend significant time in the store, and make large purchases. Fill-in trips are shorter compared to stock-up trips, and are usually made between stock-up trips to refill the products consumed in between. These trips have fewer categories visited and have smaller basket sizes. Quick trips are very short trips made to the store to purchase specific items. These trips have very small basket sizes, typically of 1 or 2 items. Occasion-based trips are made to fulfill a specific need, such as ingredients for a recipe, an item for a birthday party, an item for holiday entertaining, etc. The basket size can vary based on the occasion, but they usually have a specific set of categories visited. For example, a trip related to a birthday party might include a visit to the bakery, CSD, chips, gifts, etc.

In the exemplary embodiment shown in FIG. 16, the present invention detects 710 and tracks 714 a person, such as a shopper, in the video input images 330, from a plurality of means for capturing images 100. The present invention can join the trajectories of the person tracks from a video of a means for capturing images 100 to another video of a means for capturing images 100 while the person appears and disappears between the fields-of-view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as a u-turn in response to a crowd.

The present invention can utilize any reliable video-based tracking method for a single customer and a group of customers in the prior art, in regard to the behavior analysis. For example, U.S. patent application Ser. No. 12/215,877 of Sharma, et al. (hereinafter Sharma 12/215,877) disclosed an exemplary process of video-based tracking and behavior analysis for people in a physical space, based on the information for the trip of the people, using multiple means for capturing images in a preferred embodiment of the invention.

The present invention can also process segmentation 800 of the people, based on the images of the people in the video. Demographic classification 814 is an exemplary segmentation 800 of the people.

The present invention can utilize any reliable demographic composition measurement method in the prior art as an exemplary video-based segmentation of the people. For example, U.S. patent application Ser. No. 11/805,321 of Sharma, et al. (hereinafter Sharma 11/805,321) disclosed an exemplary demographic composition measurement based on gender and ethnicity.

Based on a background subtraction algorithm, the predefined objects, such as movable objects, are also detected 250 in the store area. The detected objects, i.e, movable objects, are tracked 251, and their shape and color are analyzed 252 for a template matching 253 to see whether the objects are a predefined movable object, such as a cart or basket. A threshold for the minimum size of a foreground blob is used to remove noises in the background subtraction process. The location and size of the installed objects in the store area are previously known. Therefore, the installed objects are identified in the measurement store area with the prior knowledge, even if the background subtraction algorithm may not detect them as foreground. If the impact of the installed objects is not measured, they can also be regarded as a part of the background.

The behavior analysis 480, segmentation 800, and template-matched object tracking 251 data are sent to the module for the association of measurements and analyses 244. Based on the analysis, the present invention calculates the crowd index 262 and the crowd impact index 272 at the crowd detection 260 and crowd impact calculation 271 processes, respectively.

As noted, the elasticity, i.e., the crowd impact, is defined as the change in behavioral response to the crowding in a cause-effect relationship, in the present invention. The present invention measures the elasticity of shopper behavior with respect to crowding, based on the associated behavior analysis 480, segmentation 800, and template-matched object tracking 251 data.

Each behavior has an elasticity associated with it, and the elasticity may change, depending on season, occasion, time-of-day, and trip type. The elasticity is measured per different segmentation. The segmentation comprises different demographic groups of people. The behaviors impacted by crowding include u-turns, shopping time, traffic to shopper conversion rate, number of shopping stops, product interaction, etc. The financial impact of crowding is measured using metrics, such as basket size, sales per square foot, total sales, etc. The impact of crowding is measured by relating the incidence of u-turns with the number of people, i.e., the crowd, in the store area, and measuring the loss caused by the incidence. The impact of crowding is also regarded as the level of barrier.

The measured data can be stored in a database at the data collection process 650. The analysis of the measured data can be further facilitated by applying 983 a set of predefined rules in a rule base 982.

Rule Application Logic Module

In the present invention, the analysis of the measured data can be further facilitated by applying 983 a set of predefined rules for the crowd index and crowd impact index calculation in a rule base 982, through a rule application logic module. The rule application logic module can enable a dynamic rule application, rather than relying on an ad hoc solution or static hard-code in translating the measured data.

An exemplary rule application logic module can be implemented utilizing the information unit verification technologies in U.S. patent application Ser. No. 11/999,649 of Jung, et al. (hereinafter Jung 11/999,649).

The rule application logic module enables the adjustment in the analysis and calculation of the indices to be done in a structured and dynamic way. The exemplary parameter models, such as the analysis formula and statistical model, can be dynamically adjusted based on the rule application logic module.

For example, in the crowd index calculation, the rule application logic module dynamically switches the definition of crowd size among the multiple approaches discussed earlier. In another example, with regard to the calculation of the crowd impact index, the rule application logic module can also dynamically switch the type of behavioral measurement, which is affected by a crowd, among many available choices.

In an exemplary embodiment, the rule application logic module can further construct the criteria, based on a combination of a set of predefined rules in which the analysis of the data can be performed in further detail. The rule application logic module can further define domain-specific criteria for the crowd impact index measurement. For example, an installed object in the layout of the store area can be integrated into the analysis criteria.

The rule application logic module can facilitate the process of producing a unified and standardized crowd impact index, by normalizing the variance within the predefined thresholds. For example, if a measurement for a crowd impact is skewed due to less desirable environmental factors, the differences can be adjusted by applying normalization offset values to the differences within predefined thresholds, using the rule application logic module. Then, the analysis can take this into consideration at the final analysis of the crowd impact.

The application of the rule application logic module can differentiate the levels of measurement and analysis of the crowd impact, where a first set of criteria are applied throughout the preliminary data, and a second set of criteria are applied to the next level of data for a complicated analysis, in order to serve the specific needs of the complicated analysis. An exemplary first set of criteria can typically comprise common criteria throughout all of the categories, and the second set of criteria is typically different from the first set of criteria.

Figure 17:
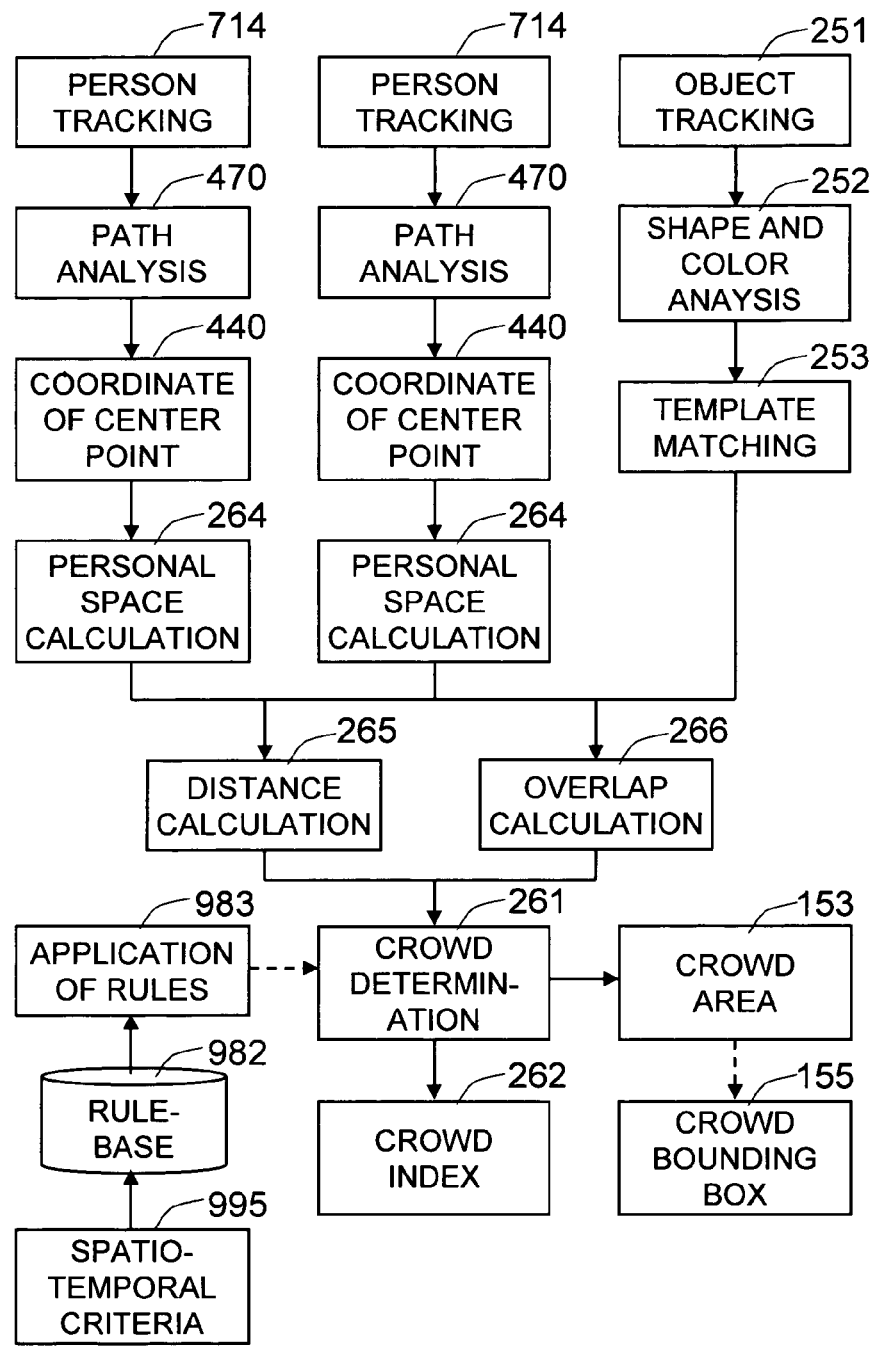
FIG. 17 shows exemplary processes for crowd detection.

FIG. 17 shows exemplary processes for crowd detection.

In the exemplary embodiment shown in FIG. 17, the present invention detects and tracks 714 each shopper when two or more shoppers appear in a store area that is targeted for the crowd impact measurement. The path analysis 470, based on the tracking information, provides the coordinate of the center point 440 of each shopper. The center point 440 of a shopper can be defined as the coordinate of the shopper's head position or the coordinate for the center of image blob for the shopper in the input images. Once the center point of a shopper is identified, using the predefined size variable, such as "r", a personal space is defined 264 for each shopper that appears in the store area. The size variable "r" can be a radius for a circular personal space in an exemplary process, or any other variable that defines the size of the personal space polygon. As noted earlier, the personal space can be defined in various ways and shapes in the present invention, including a circle, an oval, a rectangle, or an irregular polygon.

The distance 265 and overlap 266 of the personal spaces for the shoppers are calculated, and based on the application of the spatiotemporal criteria 995, such as a proximity rule over a predefined time threshold for a crowd, the present invention determines 261 whether or not the shoppers construct a crowd. Once a crowd is detected, the crowd index 262 is calculated, and the area for the crowd region 153 is also defined. A crowd bounding box 155 can encapsulate the crowd region 153. The size of crowd can increase or decrease based on a new shopper's appearance in the area, as discussed earlier.

As discussed in FIG. 6, certain movable objects that are carried by the shoppers, such as carts, can also be added to the detected crowd. The detected objects, i.e, movable objects, using the background subtraction algorithm, are tracked 251, and their shape and color are analyzed 252 for a template matching 253 to see whether the objects are a predefined movable object, such as a cart or a basket.

Figure 18:
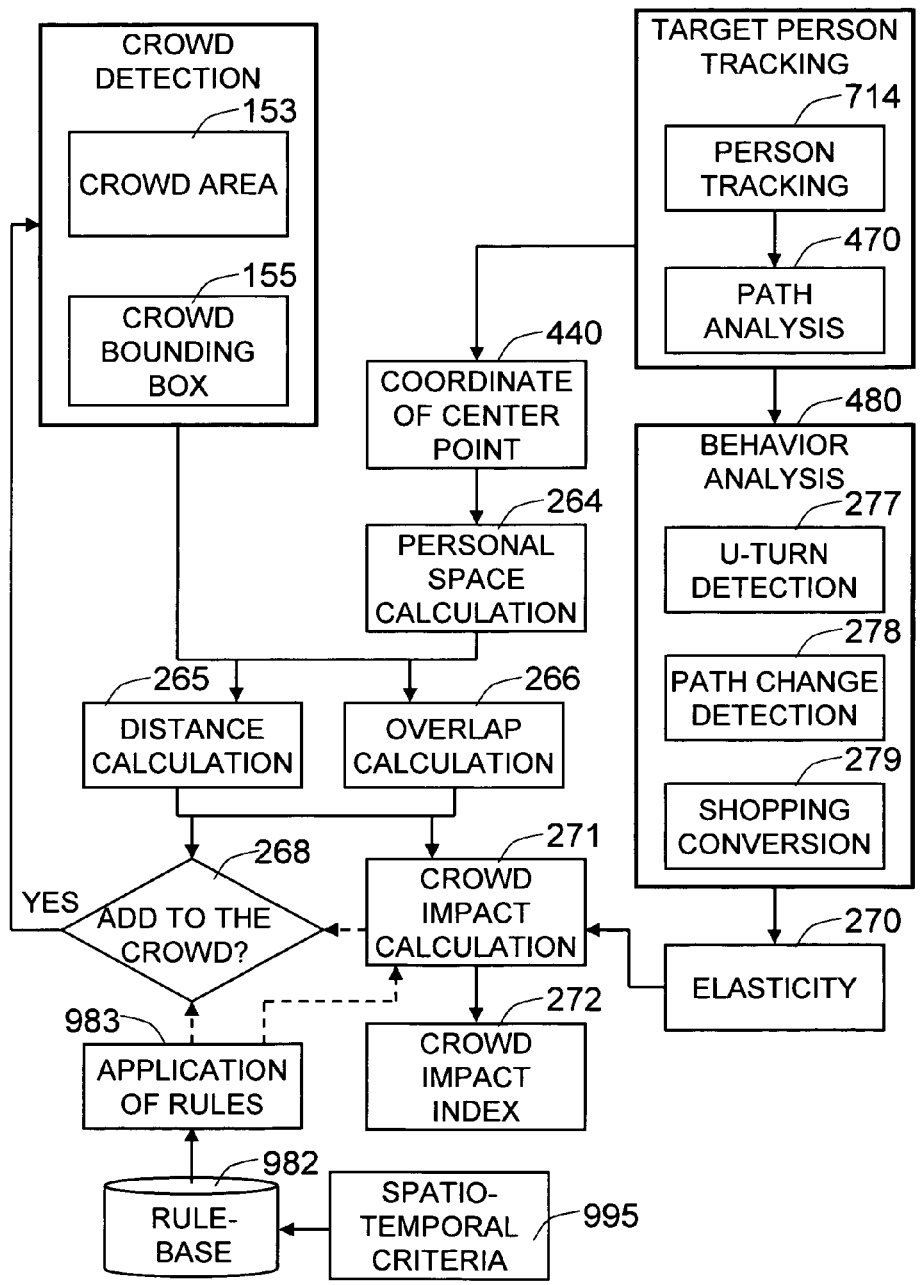
FIG. 18 shows exemplary processes for crowd impact calculation.

FIG. 18 shows exemplary processes for crowd impact calculation.

The crowd impact is measured during a predefined measurement window of time. Each impact measurement for a shopper can be accumulated during the period. The exemplary processes in FIG. 18 can be applied to each shopper who is impacted by a crowd in the store area of crowd impact measurement.

In the exemplary processes, if a new shopper appears in the store area after a crowd is detected, the crowd impact on the new shopper is measured. The present invention detects and tracks 714 the new shopper that is targeted for the crowd impact measurement. The path analysis 470 based on the tracking information of the new shopper provides the coordinate of the center point 440 of the new shopper. Once the center point 440 of the new shopper is identified, using the predefined size variable, such as radius "r", a personal space is defined 264 for the new shopper.

The distance 265 and overlap 266 of the personal space of the new shopper in relation to the crowd are calculated, e.g. using the crowd bounding box 155, and the behavioral changes are also measured 480 in correlation with the crowd, which shows the elasticity 270 by the crowd impact. The processes for detecting the behavioral changes, i.e., elasticity 270, can include u-turn detection 277, path change detection 278, and shopping conversion 279 measurement. Based on these measures and the crowd index, the impact of the crowd to the new shopper is calculated 271, and the crowd impact index 272 is produced. An exemplary method of crowd impact index 272 calculation was discussed earlier with regard to FIG. 15.

In addition to the process of calculating the crowd impact index, the present invention checks whether or not the new shopper should be added to a crowd 268 by satisfying the crowd construction criteria, i.e., based on the application of the spatiotemporal criteria 995, such as a proximity rule over a predefined time threshold for a crowd. If the new shopper is added to the crowd, the crowd index is updated, and the area for the crowd region is also redefined. Therefore, the size of the crowd can increase or decrease, based on the new shopper's appearance in the area, as discussed earlier.

If multiple crowds exist in the store area, the impact of the crowd can be measured in relation to the overall crowd index. In another exemplary embodiment of the process, the crowd impact can also be measured in relation to each local crowd for further details and complicated analysis of the crowd dynamics in the store area.

FIG. 19 shows an exemplary network of a plurality of means for control and processing and a plurality of means for capturing images in the present invention, where the network further consists of a plurality of first means for control and processing and a plurality of second means for control and processing, which communicate with each other to synchronize the time-stamped lists of measurement among a plurality of video streams captured by the means for capturing images in the measured locations.

The present invention is a system and apparatus for determining the impact of crowding on retail performance based on the measurement for behavior patterns and demographics of the people in a store area, such as an aisle area. The apparatus comprises means for capturing a plurality of input images of the people by at least a means for capturing images, e.g., first means for capturing images 101 and second means for capturing images 102 in the vicinity of the store area, and means for processing the plurality of input images, e.g. first means for control and processing 107 or second means for control and processing 108, in order to measure the behavior patterns and demographics of each person among the people in the store area. The apparatus also comprises means for aggregating the measurements for the behavior patterns and demographics of the people, and means for calculating a set of indices, including crowd index and crowd impact index, based on the measurements. The behavior patterns comprise traffic count, u-turns, and interaction with the categories in the store area. The first means for control and processing 107 or second means for control and processing 108 may be used as the exemplary embodiment of these means for aggregating the measurements and means for calculating a set of indices.

In the exemplary embodiment, a plurality of means for capturing images, e.g., a plurality of first means for capturing images 101, are connected to the means for video interface in a means for control and processing, e.g., a first means for control and processing 107.

The sensors are placed in a distributed architecture to facilitate the measurement of the response data. If the distance between the plurality of means for capturing images is greater than a means for control and processing can handle, the plurality of means for capturing images can be connected to multiple means for video interface.

For example, in the exemplary embodiment shown in FIG. 19, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field-of-view can cover the traffic of the people in the measured location, and the second means for capturing images 102 can be installed in an area in which the frontal view of the people can be captured. The means for capturing images are connected to the means for video interface through cables.

The digitized video data from the means for video interface are transferred to the means for control and processing that executes computer vision algorithms on the data. The means for control and processing can have internal means for storing data or external means for storing data.

The means for capturing images can comprise an analog camera, a USB camera, or a Firewire camera. The means for video interface, which can comprise a video frame grabber, a USB interface, or a Firewire interface, are typically included in the same enclosure as the means for control and processing.

The means for control and processing can be a general purpose personal computer, such as a Pentium 4 PC, or a dedicated hardware, such as an FPGA-based implementation of a device, which can carry out the required computation. The means for control and processing, as well as the means for video interface, can be placed locally or remotely, as long as the connection to the means for capturing images can be established.

The internal means for storing data, such as internal hard disk drives, is placed within the same enclosure as the means for control and processing. The external means for storing data, such as a network storage driver or internal hard disk drives contained in a remote computer, can be placed locally or remotely, as long as a means for transferring data is available.

The present invention can generate time-stamped measurements in accordance with the behavior analysis and segmentation, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization, utilizing a time synchronization protocol, such as the Network Time Protocol (NTP). The time-stamped measurements facilitate the synchronized analysis, calculation, and utilization of the measurements.

The number of means for capturing images per a means for control and processing varies, depending on the system configuration in the physical space. However, each means for control and processing knows the identification of the associated plurality of means for capturing images that are assigned to the selected locations in a store area and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining impact of crowding on retail performance based on a measurement for behavior patterns of people in a store area using computer vision-based behavior analysis and segmentation measurement, comprising the following steps of:
   a) processing a plurality of input images in order to track each person among the people using a computer, by applying a computer vision-based tracking algorithm to the plurality of input images that are captured by a means for capturing images in the store area, wherein the plurality of input images are transferred to the computer via a means for video interface,
   b) identifying a subset of the people as a crowd based on a first path analysis of tracks by tracking each person among the people,
   c) measuring the behavior patterns of a person based on a second path analysis of tracks by tracking the person in relation to the crowd,
   d) measuring segmentation of the person in relation to the crowd,
   e) aggregating the measurements for the behavior patterns and segmentation over a predefined window of time, using the computer, and
   f) calculating a crowd index and a crowd impact index for the store area based on the measurements, using the computer,
   g) measuring elasticity of behavior of the people with respect to crowding,
   wherein the elasticity is defined as a change in behavioral response, the elasticity changes, depending on season, occasion, time-of-day, or trip type, and the elasticity is measured per segment that includes a demographic group or a group of people with a same trip type, and
   h) calculating an average density of sections in the store area over a predefined period of time,
   wherein the density is measured based on traffic counts using the computer vision-based tracking of each person,
   wherein the first path analysis comprises an application of a proximity rule among the tracks,
   wherein the crowd impact index comprises a traffic count and a shopping time index of people outside the crowd and whose shopping activity is impacted by the crowd,
   wherein the segmentation includes classification of demographic groups and trip types of the people, and
   wherein the trip types include stock-up trip, fill-in trip, quick trip, and occasion-based trip.

2. The method according to claim 1, wherein the method further comprises a step of counting the number of people within a given radius of a person, as a relative measure among the people,
   wherein a starting point of the radius is a center point of each person, and
   wherein the size of the radius is adjusted to change granularity for calculating the crowd index and the crowd impact index.

3. The method according to claim 1, wherein the method further comprises a step of measuring different behaviors impacted by crowding, including u-turns, shopping time, traffic to shopper conversion rate, basket size, and sales,
   wherein the traffic to shopper conversion rate is measured by calculating a percentage of shoppers among people who form traffic in the store area during the predefined window of time.

4. The method according to claim 1, wherein the method further comprises a step of measuring the impact of crowding by relating the incidence of u-turns with the number of people in the store area and measuring a loss caused by the incidence, wherein the loss comprises loss of sales, loss of dollar value, and loss of shopper traffic count in the store area.

5. The method according to claim 1, wherein the method further comprises a step of measuring the relationship of the crowd index and the crowd impact index with the performance of product categories in the store area,
   wherein the relationship is analyzed according to the characteristics of the product categories,
   including product category distribution and product category allocation.

6. The method according to claim 1, wherein the method further comprises a step of measuring the relationship of the crowd index and the crowd impact index with store layout in the store area,
   whereby the measurement is used to optimize the size and shape of the aisle and to control crowd navigation.

7. The method according to claim 1, wherein the method further comprises a step of measuring the relationship of the crowd index and the crowd impact index with purchase movement between premeditated purchase movement and impulse purchase movement.

8. The method according to claim 1, wherein the method further comprises a step of calculating optimal shopper distance among the shoppers by measuring the distance between tracks in the crowd,
   wherein the optimal shopper distance provides a level of crowding in the store area at which total sales are highest or sales per shopper are highest.

9. An apparatus for determining impact of crowding on retail performance based on a measurement for behavior patterns of people in a store area using computer vision-based behavior analysis and segmentation measurement, comprising:
   a) means for capturing a plurality of input images of the people by at lust a means for capturing images in the store area,
   b) a means for video interface that transfers the plurality of input images to a computer, and
   c) the computer that is programmed to perform the following steps of:
      processing the plurality of input images in order to track each person among the people, by applying a computer vision-based tracking algorithm to the plurality of input images that are captured by the means for capturing images,
      identifying a subset of the people as a crowd based on a first path analysis of tracks by tracking each person among the people,
      measuring the behavior patterns of a person based on a second path analysis of tracks by tracking the person in relation to the crowd,
      measuring segmentation of the person in relation to the crowd,
      aggregating the measurements for the behavior patterns and segmentation over a predefined window of time, using the computer,
      calculating a crowd index and a crowd impact index for the store area based on the measurements,
      measuring elasticity of behavior of the people with respect to crowding,
      wherein the elasticity is defined as a change in behavioral response, the elasticity changes, depending on season, occasion, time-of-day, or trip type, and the elasticity is measured per segment that includes a demographic group or a group of people with a same trip type, and
      calculating an average density of sections in the store area over a predefined period of time, wherein the density is measured based on traffic counts using the computer vision-based tracking of each person,
      wherein the first path analysis comprises an application of a proximity rule among the tracks,
      wherein the crowd impact index comprises a traffic count and a shopping time index of people outside the crowd and whose shopping activity is impacted by the crowd,
      wherein the segmentation includes classification of demographic groups and trip types of the people, and
      wherein the trip types include stock-up trip, fill-in trip, quick trip, and occasion-based trip.

10. The apparatus according to claim 9, wherein the apparatus further comprises a computer for counting the number of people within a given radius of a person, as a relative measure among the people,
    wherein a starting point of the radius is a center point of each person, and
    wherein the size of the radius is adjusted to change granularity for calculating the crowd index and the crowd impact index.

11. The apparatus according to claim 9, wherein the apparatus further comprises a computer for measuring different behaviors impacted by crowding, including u-turns, shopping time, traffic to shopper conversion rate, basket size, and sales,
    wherein the traffic to shopper conversion rate is measured by calculating a percentage of shoppers among people who form traffic in the store area during the predefined window of time.

12. The apparatus according to claim 9, wherein the apparatus further comprises a computer for measuring the impact of crowding by relating the incidence of u-turns with the number of people in the store area and measuring a loss caused by the incidence,
    wherein the loss comprises loss of sales, loss of dollar value, and loss of shopper traffic count in the store area.

13. The apparatus according to claim 9, wherein the apparatus further comprises a computer for measuring the relationship of the crowd index and the crowd impact index with the performance of product categories in the store area,
    wherein the relationship is analyzed according to the characteristics of the product categories,
    including product category distribution and product category allocation.

14. The apparatus according to claim 9, wherein the apparatus further comprises a computer for measuring the relationship of the crowd index and the crowd impact index with store layout in the store area,
    whereby the measurement is used to optimize the size and shape of the aisle and to control crowd navigation.

15. The apparatus according to claim 9, wherein the apparatus further comprises a computer for measuring the relationship of the crowd index and the crowd impact index with purchase movement between premeditated purchase movement and impulse purchase movement.

16. The apparatus according to claim 9, wherein the apparatus further comprises a computer for calculating optimal shopper distance among the shoppers by measuring the distance between tracks in the crowd, wherein the optimal shopper distance provides a level of crowding in the store area at which total sales are highest or sales per shopper are highest.

\* \* \* \* \*